(12) United States Patent
Umlauf

(10) Patent No.: US 10,518,676 B2
(45) Date of Patent: Dec. 31, 2019

(54) CARGO COVER AND PARTITION

(71) Applicant: 4Knines, LLC, Vernon Hills, IL (US)

(72) Inventor: James Umlauf, Glendale, AZ (US)

(*) Notice: Subject to any disclaimer, the term of this patent is extended or adjusted under 35 U.S.C. 154(b) by 0 days.

(21) Appl. No.: 16/393,731

(22) Filed: Apr. 24, 2019

(65) Prior Publication Data

US 2019/0248259 A1 Aug. 15, 2019

Related U.S. Application Data

(63) Continuation of application No. 15/973,323, filed on May 7, 2018, now Pat. No. 10,343,568, which is a continuation-in-part of application No. 15/632,087, filed on Jun. 23, 2017, now Pat. No. 9,963,086, which is a continuation of application No. 15/093,592, filed on Apr. 7, 2016, now Pat. No. 9,815,395.

(60) Provisional application No. 62/283,136, filed on Aug. 21, 2015, provisional application No. 62/283,114, filed on Aug. 21, 2015, provisional application No. 62/179,236, filed on May 1, 2015.

(51) Int. Cl.
| | |
|---|---|
| *B60N 2/60* | (2006.01) |
| *B60J 7/00* | (2006.01) |
| *B60R 13/01* | (2006.01) |
| *B60R 7/04* | (2006.01) |
| *B60N 2/36* | (2006.01) |

(52) U.S. Cl.
CPC .......... *B60N 2/6009* (2013.01); *B60J 7/0007* (2013.01); *B60N 2/60* (2013.01); *B60N 2/6018* (2013.01); *B60N 2/6036* (2013.01); *B60R 7/043* (2013.01); *B60R 13/011* (2013.01); *B60N 2002/363* (2013.01); *B60R 2013/016* (2013.01)

(58) Field of Classification Search
CPC .......... B60R 13/011; B60R 5/04; B60N 2/44; B60N 2/60; B60N 2/90
USPC ........................................ 296/39.1
See application file for complete search history.

(56) References Cited

U.S. PATENT DOCUMENTS

| | | | | |
|---|---|---|---|---|
| 4,877,281 A | * | 10/1989 | Altmann ................. | B60R 13/01 296/39.1 X |
| 4,943,105 A | * | 7/1990 | Kacar .................. | A01K 1/0272 296/39.1 |
| 5,215,345 A | * | 6/1993 | Orphan ................ | B60N 2/3013 296/39.1 X |
| 5,322,335 A | * | 6/1994 | Niemi .................. | B60N 2/6009 296/39.1 |

(Continued)

*Primary Examiner* — Anthony D Barfield
(74) *Attorney, Agent, or Firm* — David R. Conklin; Kirton McConkie

(57) ABSTRACT

A cargo liner for a vehicle may include a cargo area portion sized and configured to extend over a horizontally-oriented cargo area of a vehicle. The cover may also include a seatback portion coupled to the lower portion. The seatback portion may be sized and configured to extend upwardly over a seatback of a vehicle seat. The seatback portion may include a first section, a second section, and a third section. Each of the first section, the second section, and the third section may extend from an upper edge of the upper portion to the cargo area portion. The cargo liner may include a guard portion elevating mechanism that is manipulable to cause the guard portion to transition between a lowered state and an elevated state wherein at least a segment of the guard portion proximate the cargo bed portion extends upwardly to provide a rear barrier.

13 Claims, 25 Drawing Sheets

(56) References Cited

U.S. PATENT DOCUMENTS 9,010,856 B2 * 4/2015 Krankkala ............... B60N 2/60
　　　　　　　　　　　　　　　　　　　　297/219.1

* cited by examiner

CARGO COVER AND PARTITION

RELATED APPLICATIONS

This application is a continuation application of U.S. Non-Provisional Ser. No. 15/973,323 filed on May 7, 2018, now U.S. Pat. No. 10,343,568 and a continuation-in-part application of U.S. Non-Provisional application Ser. No. 15/632,087, entitled COVER ADAPTABLE TO MULTIPLE VEHICLE SEAT CONFIGURATIONS, filed Jun. 23, 2017, now U.S. Pat. No. 9,963,086, which claims priority to U.S. Non-Provisional application Ser. No. 15/093,592, entitled SEAT COVER ADAPTABLE TO MULTIPLE VEHICLE SEAT CONFIGURATIONS, filed Apr. 7, 2016, now U.S. Pat. No. 9,815,395, which claims priority to U.S. Provisional Application Ser. No. 62/179,236, entitled SEAT COVER ADAPTABLE TO MULTIPLE SEAT VEHICLE CONFIGURATIONS, filed on May 1, 2015, U.S. Provisional Application Ser. No. 62/283,136, entitled SEAT COVER ADAPTABLE TO MULTIPLE SEAT VEHICLE CONFIGURATIONS, filed on Aug. 21, 2015, and U.S. Provisional Application Ser. No. 62/283,114, entitled SEAT COVER ADAPTABLE TO MULTIPLE SEAT VEHICLE CONFIGURATIONS, filed on Aug. 21, 2015, each of which is incorporated herein in its entirety.

BACKGROUND OF THE INVENTION

The present invention relates to a cover for an interior of a vehicle. In particular, the present invention relates to a cover adaptable to multiple vehicle seat configurations. In some embodiments, the cover for the vehicle may be used as seat cover and/or a cargo bed cover. Vehicle seats may be designed to move between various configurations, such as, for example, one section up and another section folded down, in order to allow items of various sizes to be transported in the vehicle. A cover for a vehicle seat and/or a cargo bed may be limited to a particular type of car, with particular dimensions and features, or a particular seat configuration. In some cases, the cover may not permit movement of the vehicle seat between the various configurations or may cover various features, such as seat belts. In order to perform a particular function in the vehicle, the cover may need to be removed. Further, vehicle seats may be exposed to various events that may damage the vehicle seats due to, for example, pets, children, spills, objects, etc.

BRIEF SUMMARY OF THE INVENTION

The present invention relates to a cover for an interior of a vehicle. In particular, the present invention relates to a cover adaptable to multiple vehicle seat configurations. In some embodiments, the cover for the vehicle may include a seat cover or a cargo bed cover. In some embodiments, the cover may include a lower portion. In some embodiments, the lower portion may be sized and configured to extend over a horizontally-oriented top of a bench of a vehicle seat. In some embodiments, the lower portion may be sized and configured to extend over a horizontally-oriented cargo area of the vehicle.

In some embodiments, the cover may also include an upper portion coupled to the lower portion. In some embodiments, the upper portion may be sized and configured to extend upwardly over a backrest of the vehicle seat. In some embodiments, the upper portion may be sized and configured to extend upwardly over a rear surface of the backrest.

In some embodiments, the upper portion may include a first section, a second section, and a third section. In some embodiments, the first section, the second section, and the third section may extend from an upper edge of the upper portion to the lower portion. In some embodiments, the first and second sections may be separated by a first vertical slit. In some embodiments, the second and third sections may be separated by a second vertical slit.

In some embodiments, the cover may include a first coupling mechanism, which may be configured to directly couple the first section and the second section. In some embodiments, the first coupling mechanism may be configured to at least partially close the first vertical slit. In some embodiments, the cover may include a second coupling mechanism, which may be configured to directly couple the second section and the third section. In some embodiments, the second coupling mechanism may be configured to at least partially close the second vertical slit. Coupling mechanisms may be configured to facilitate coupling and uncoupling.

In some embodiments, the first section may be configured to be folded on top of the lower portion independently of the second and third sections in response to the first section being uncoupled from the second section via the first coupling mechanism. In some embodiments, when the cover is used as the seat cover, the first section may be configured to be folded on top of the lower portion independently of the second and third sections in response to the first section being uncoupled from the second section via the first coupling mechanism and/or a first portion of the backrest being moved to a folded position. In some embodiments, when the cover is used as the cargo seat cover, the first section may be configured to move to a generally horizontal position independently of the second and third sections in response to the first section being uncoupled from the second section via the first coupling mechanism and/or a third portion of the backrest being moved to a folded position.

In some embodiments, the second section may be configured to be folded on top of the lower portion independently of the first and third sections in response to the first section being uncoupled from the second section via the first coupling mechanism and the third section being uncoupled from the second section via the second coupling mechanism. In some embodiments, when the cover is used as the seat cover, the second section may be configured to be folded on top of the lower portion independently of the first and third sections in response to the first section being uncoupled from the second section via the first coupling mechanism and the third section being uncoupled from the second section via the second coupling mechanism, and further in response to a second portion of the back rest being moved to a folded position. In some embodiments, when the cover is used as the cargo bed cover, the second section may be configured to move to a generally horizontal position independently of the first and third sections in response the first section being uncoupled from the second section via the first coupling mechanism and the third section being uncoupled from the second section via the second coupling mechanism, and further in response to the second portion of the back rest being moved to the folded position.

In some embodiments, the third section may be configured to be folded on top of the lower portion independently of the first and second sections in response to the third section being uncoupled from the second section via the second coupling mechanism. In some embodiments, when the cover is used as the seat cover, the third section may be configured to be folded on top of the lower portion independently of the first and second sections in response to the third section being uncoupled from the second section via the second coupling mechanism and/or the third portion of the backrest being moved to a folded position. In some embodiments, when the cover is used as the cargo bed cover, the third section may be configured to move to a generally horizontal position independently of the first and second sections in response to the third section being uncoupled from the second section via the second coupling mechanism and/or the first portion of the back rest being moved to the folded position.

In some embodiments, an upper portion of the first section and/or an upper portion of the third section may each include an anchor. In some embodiments, the anchor may be configured to secure the cover to a headrest of the vehicle.

In some embodiments, the cover may include one or more openings disposed between the upper portion and the lower portion. In some embodiments, the one or more openings may include one or more of the following: a first opening, a second opening, a third opening, and a fourth opening. In some embodiments, one or more of the first opening, the second opening, the third opening, and the fourth opening may include a generally horizontal slit. In some embodiments, the first opening may extend along a portion of a lower edge of the first section to at least the second section. In some embodiments, the first opening may extend along the portion of the lower edge of the first section to the third section. In these embodiments, in response to the first section being uncoupled from the second section via the first coupling mechanism and the third section being uncoupled from the second section via the second coupling mechanism, the second section may be detached or removed from the cover.

The second opening may extend along a portion of a lower edge of the third section to at least the second section. In some embodiments, the second opening may extend along the portion of the lower edge of the third section to the first section. In these embodiments, in response to the third section being uncoupled from the second section via the second coupling mechanism and the first section being uncoupled from the second section via the first coupling mechanism, the second section may be detached or removed from the cover.

In some embodiments, the third opening may be disposed between the first section and the lower portion. In some embodiments, the fourth opening may be disposed between the third section and the lower portion. In some embodiments, the first opening, the second opening, and/or the fourth opening may be configured to receive a seat belt. In some embodiments, the first opening, the second opening, the third opening and/or the fourth opening may be configured to receive a fastener used to anchor a child car seat.

In some embodiments, the lower portion may include a slit, which may extend linearly inward from a lower edge of the lower portion. The slit may allow a section of the lower portion to be folded over to expose a portion of a floor of the cargo bay. In some embodiments, the slit may extend linearly inward from a center of the lower edge of the lower portion.

In some embodiments, one or more of the following may extend along substantially all of a height of the upper portion: the first vertical slit, the second vertical slit, the first coupling mechanism, and the second coupling mechanism. In some embodiments, the first coupling mechanism may extend along at least a portion of the first vertical slit and/or the second coupling mechanism may extend along at least a portion of the second vertical slit. The first and second coupling mechanisms may each include any suitable coupling mechanism, such as for example, one or more zippers, buttons, snaps, magnets, clasps, eyelets, hooks, VELCRO™, etc.

In some embodiments, the cover may be constructed of a fabric material, such as, for example, one or more of the following: spandex knit, lycra knit, jersey knit, interlock knit, ribbed knit, terry knit, sweater knit, modal knit, hemp knit, bamboo knit, silk knit, cotton knit, ponte de roma, thermal knit, stretch lace, synthetic knit, organic knit, polyvinyl chloride, cotton, nylon, polyester, etc. In some embodiments, the fabric material may be stretchable. In some embodiments, the fabric material may allow the cover to be pliable so the cover may be folded and/or conform to a shape and dimension of the vehicle. In some embodiments, the fabric material may be weather-proof and/or machine-washable. In some embodiments, the cover may include a first layer of the fabric material and a second layer of the fabric material, which may be sewn together. In some embodiments, padding may be disposed between at least a portion of the first and second layers of the fabric material.

In some embodiments, the cover may include another layer or backing layer, which may be disposed on at least a portion of an underside of the cover. For example, when the cover is used as the cargo bed cover, the backing layer may be disposed on an underside of the upper and lower portions. As another example, when the cover is used as the seat cover, the backing layer may be disposed on an underside of the lower section. In some embodiments, the backing layer may be configured to prevent slippage and/or increase friction between the cover and the seat and/or the cargo bed. In some embodiments, the backing layer may include a netting. In some embodiments, the backing layer may be constructed of rubber, plastic, or another suitable material that allows the cover to be flexible and/or foldable. In some embodiments, the cover may include a water-proof coating.

In some embodiments, the cover may include a guard portion, which may be coupled to a lower edge of the lower portion. In some embodiments, the guard portion may include a pliable skirt. In some embodiments, when the cover is used as the cargo bed cover, the guard may be configured to extend over a bumper of the vehicle. In some embodiments, when the cover is used as the seat cover, the guard may be configured to extend vertically and/or generally perpendicularly from the lower portion. The guard portion may or may not include the padding.

In some embodiments, a cargo bed cover system may include a head liner cover and/or the cover. In some embodiments, the head liner cover may include one or more fasteners coupled to an interior of the vehicle. In some embodiments, the head liner cover may be disposed above the cargo bed of the vehicle. The interior of the vehicle may include a ceiling and/or a door of the vehicle. In some embodiments, the head liner cover may include an elongated fabric material, which may have a length approximately equal to a width of the vehicle. In some embodiments, the one or more fasteners may be configured to secure the fabric material at least proximate the ceiling. For example, the fabric material may be spaced apart and/or touch the ceiling. The one or more fasteners may each include a hook, a button, a zipper, a snap, a magnet, a clasp, an eyelet, a hook, VELCRO™, or another suitable fastener.

In some embodiments, a cargo liner for a vehicle may include a cargo bed portion sized and configured to extend over a horizontally-oriented surface of a vehicle cargo area. A seatback portion may extend from the cargo bed portion, wherein the seatback portion is sized and configured to extend upwardly over a seatback of a vehicle seat. A guard portion may be coupled to a lower edge of the cargo bed portion and configured to extend over a bumper of the vehicle. The cargo line may include a guard portion elevating mechanism that is manipulable to cause the guard portion to transition between a lowered state wherein the guard portion is configured to extend over the bumper of the vehicle and an elevated state wherein at least a segment of the guard portion proximate the cargo bed portion extends upwardly to provide a barrier to better retain objects within the vehicle cargo area.

The cargo liner may include a plurality of slits arranged about a perimeter of the cargo bed portion to provide at least one articulable surface of the guard portion. Two of the plurality of slits may be interposed between the cargo bed portion and the guard portion. The guard portion may be generally rectangular.

The seatback portion may have a first section, a second section, and a third section, wherein each of the first section, the second section, and the third section extend from an upper edge of the seatback portion to the cargo bed portion. The cargo liner may also include a first coupling mechanism configured to couple the first section to the second section and a second coupling mechanism configured to couple the second section to the third section.

In some embodiments, a stiffening rod may extend across the guard portion, whereby when the guard portion elevating mechanism is manipulated to cause the guard portion to be in the elevated state, the stiffening rod is located proximate an upper edge of the guard portion, thereby stiffening the upper edge of the guard portion to better retain objects within the vehicle cargo area.

In some embodiments, the guard portion elevating mechanism may include a pair of cargo bed coupling mechanisms on the cargo bed portion and a corresponding pair of guard coupling mechanisms on the guard portion, whereby coupling adjacent cargo bed and guard coupling mechanisms causes the guard portion to assume the elevated state, and whereby decoupling the adjacent cargo bed and guard coupling mechanisms allows the guard portion to transition to the lowered state. The cargo bed coupling mechanisms and the guard coupling mechanisms may include coupling mechanisms such as zippers, hook-and-loop fasteners, buttons, snaps, clasps, magnets, eyelets, and hooks.

In some embodiments, the guard portion elevating mechanism may include a cord extending between the cargo bed portion and the guard portion at a transition between the cargo bed portion and the guard portion and a securing mechanism configured to reversibly secure the cord in a shortened state, whereby the shortened state of the cord retains the guard portion in the elevated state, and whereby loosening the cord allows the guard portion to transition to the lowered state. The securing mechanism may include a securing mechanism such as a cord lock, a hook affixed to the cargo bed portion, a hook affixed to the guard portion, a hook affixed to a side wall or side window of the vehicle cargo area, a fastener affixed to the cargo bed portion, a fastener affixed to the guard portion, and a fastener affixed to the side wall or side window of the vehicle cargo area. The cord may be a shock cord.

In some embodiments, the guard portion elevating mechanism may include a fastener secured to a side window or side wall of the vehicle cargo area and a fastener engagement element located on the guard portion and spaced from a transition between the cargo bed portion and the guard portion, the fastener engagement element being configured to reversibly engage the fastener.

In some embodiments, a cargo liner for a vehicle may include a cargo bed portion sized and configured to extend over a horizontally-oriented surface of a vehicle cargo area, a seatback portion extending from the cargo bed portion, wherein the seatback portion is sized and configured to extend upwardly over a seatback of a vehicle seat, and a guard portion coupled to a lower edge of the cargo bed portion and configured to extend over a bumper of the vehicle. The cargo liner may also include a guard portion elevating mechanism that is manipulable to cause the guard portion to transition between a lowered state wherein the guard portion is configured to extend over the bumper of the vehicle and an elevated state wherein at least a segment of the guard portion proximate the cargo bed portion extends upwardly to provide a barrier to better retain objects within the vehicle cargo area. The cargo liner may also include a stiffening rod extending across the guard portion parallel to a line of transition between the cargo bed portion and the guard portion and spaced from the line of transition, whereby when the guard portion elevating mechanism is manipulated to cause the guard portion to be in the elevated state, the stiffening rod is located proximate an upper edge of the guard portion, thereby stiffening the upper edge of the guard portion to better retain objects within the vehicle cargo area.

In some embodiments, the guard portion elevating mechanism may include a pair of cargo bed coupling mechanisms on the cargo bed portion and a corresponding pair of guard coupling mechanisms on the guard portion, whereby coupling adjacent cargo bed and guard coupling mechanisms causes the guard portion to assume the elevated state, and whereby decoupling the adjacent cargo bed and guard coupling mechanisms allows the guard portion to transition to the lowered state. The cargo bed coupling mechanisms and the guard coupling mechanisms may include coupling mechanisms such as zippers, hook-and-loop fasteners, buttons, snaps, clasps, magnets, eyelets, and hooks.

In some embodiments, the guard portion elevating mechanism may include a cord extending between the cargo bed portion and the guard portion at a transition between the cargo bed portion and the guard portion and a securing mechanism configured to reversibly secure the cord in a shortened state, whereby the shortened state of the cord retains the guard portion in the elevated state, and whereby loosening the cord allows the guard portion to transition to the lowered state. The securing mechanism may include a securing mechanism such as a cord lock, a hook affixed to the cargo bed portion, a hook affixed to the guard portion, a hook affixed to a side wall or side window of the vehicle cargo area, a fastener affixed to the cargo bed portion, a fastener affixed to the guard portion, and a fastener affixed to the side wall or side window of the vehicle cargo area. The cord may be a shock cord.

In some embodiments, the guard portion elevating mechanism may include a fastener secured to a side window or side wall of the vehicle cargo area and a fastener engagement element located on the guard portion and spaced from a transition between the cargo bed portion and the guard portion, the fastener engagement element being configured to reversibly engage the fastener.

In some embodiments, a cargo liner for a vehicle includes a cargo bed portion sized and configured to extend over a horizontally-oriented surface of a vehicle cargo area, a seatback portion extending from the cargo bed portion, wherein the seatback portion is sized and configured to extend upwardly over a seatback of a vehicle seat wherein the seatback portion has a first section, a second section, and a third section, wherein each of the first section, the second section, and the third section extend from an upper edge of the seatback portion to the cargo bed portion, a first coupling mechanism configured to couple the first section to the second section, and a second coupling mechanism configured to couple the second section to the third section. The cargo line may also include a guard portion coupled to a lower edge of the cargo bed portion and configured to extend over a bumper of the vehicle, a guard portion elevating mechanism that is manipulable to cause the guard portion to transition between a lowered state wherein the guard portion is configured to extend over the bumper of the vehicle and an elevated state wherein at least a segment of the guard portion proximate the cargo bed portion extends upwardly to provide a barrier to better retain objects within the vehicle cargo area, and a stiffening rod extending across the guard portion parallel to a line of transition between the cargo bed portion and the guard portion and spaced from the line of transition, whereby when the guard portion elevating mechanism is manipulated to cause the guard portion to be in the elevated state, the stiffening rod is located proximate an upper edge of the guard portion, thereby stiffening the upper edge of the guard portion to better retain objects within the vehicle cargo area.

The stiffening rod may be removable from the guard portion. The stiffening rod may be retained in a pouch or pocket disposed on one of the layers of the guard portion, or may be retained in a pouch or pocket disposed between layers of the guard portion. The stiffening rod may be disposed on a surface of the guard portion and may be retained thereon by a retention mechanism, such as a clip, a tie, a snap, or any other retention mechanism.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. These drawings depict only typical embodiments of the invention and are not therefore to be considered to limit the scope of the invention.

DETAILED DESCRIPTION OF THE INVENTION

The presently preferred embodiments of the present invention will be best understood by reference to the drawings, wherein like reference numbers indicate identical or functionally similar elements. It will be readily understood that the components of the present invention, as generally described and illustrated in the figures herein, could be arranged and designed in a wide variety of different configurations. Thus, the following more detailed description, as represented in the figures, is not intended to limit the scope of the invention as claimed, but is merely representative of presently preferred embodiments of the invention.

Figure 1:
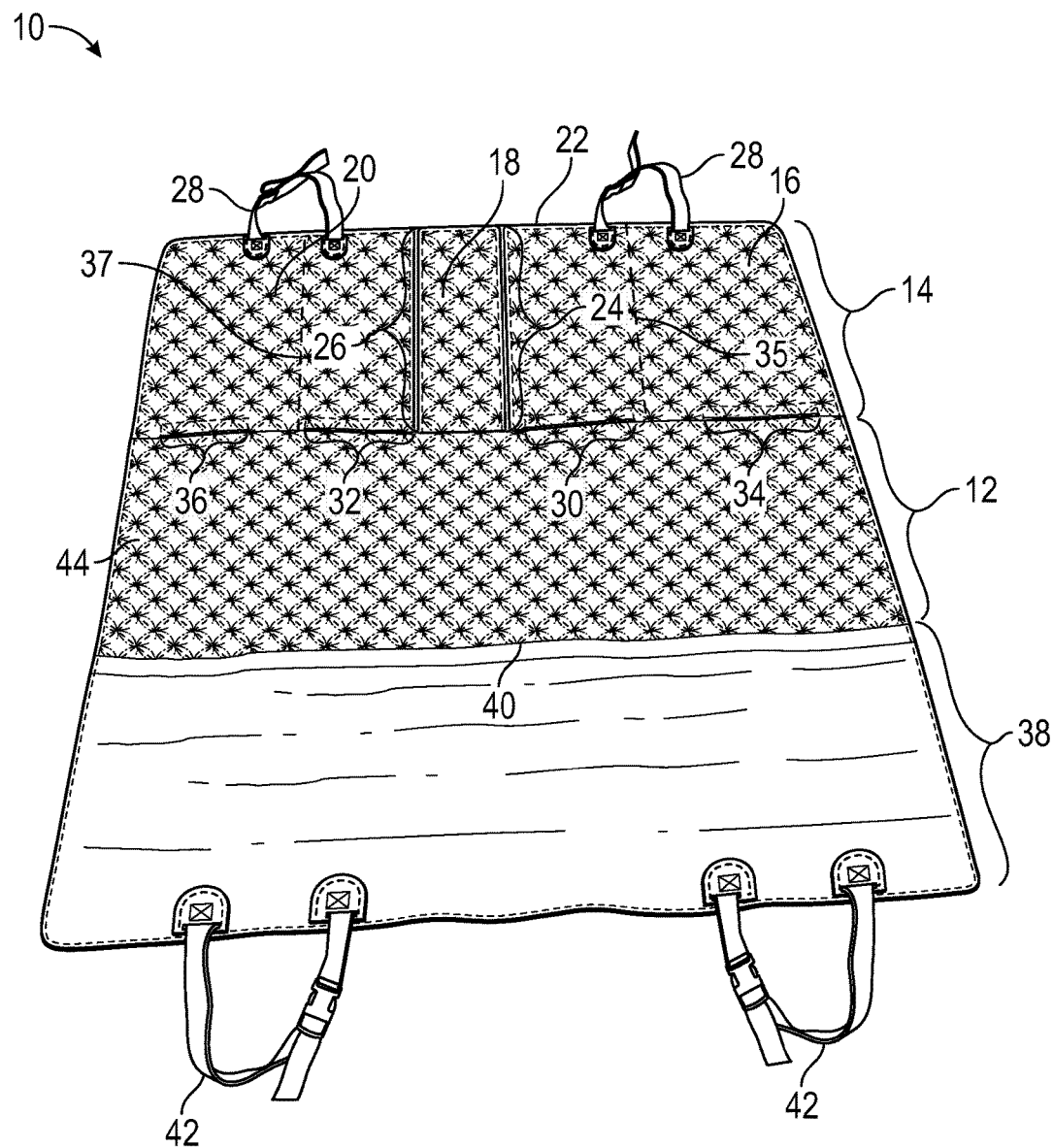
FIG. 1 is a top view of an example cover, according to some embodiments.

Referring now to FIG. 1, in some embodiments, the cover 10 for the vehicle may include a seat cover and/or a cargo bed cover. In some embodiments, the cover 10 may include a lower portion 12. In some embodiments, the cover 10 may also include an upper portion 14 coupled to the lower portion 12.

In some embodiments, the upper portion 14 may include one or more of the following: a first section 16, a second section 18, and a third section 20. In some embodiments, the first section 16, the second section 18, and the third section 20 may extend from an upper edge 22 of the upper portion 14 to the lower portion 12. In some embodiments, the first and second sections 16, 18 may be separated by a first vertical slit 24. In some embodiments, the second and third sections 18, 20 may be separated by a second vertical slit 26.

In some embodiments, the cover 10 may include a first coupling mechanism, which may be configured to directly couple the first section 16 and the second section 18. In some embodiments, the first coupling mechanism may be configured to at least partially close the first vertical slit 24, which may extend from the upper edge 22 to the lower portion 12. In some embodiments, the cover 10 may include a second coupling mechanism, which may be configured to directly couple the second section 18 and the third section 20. In some embodiments, the second coupling mechanism may be configured to at least partially close the second vertical slit 26.

In some embodiments, one or more of the following may include one or more fasteners 28 configured to secure the cover 10 to the seat: an upper portion of the first section 16, an upper portion of the second section 18, and an upper portion of the third section 20. In some embodiments, the fasteners 28 may be configured to secure the cover 10 to one or more headrests of the vehicle. In some embodiments, the upper portion of the first section 16 and the upper portion of the third section 20 may include a fastener 28. Each of the fasteners 28 may include any suitable means of securing the cover 10 to the seat. For example, as illustrated in FIG. 1, each of the fasteners 28 may include a belt, which may be configured to form a loop around the headrest. In some embodiments, the loop may include a clasp.

In some embodiments, the cover 10 may include one or more openings disposed between the upper portion 14 and the lower portion 12. In some embodiments, the one or more openings may include one or more of the following: a first opening 30, a second opening 32, a third opening 34, and a fourth opening 36. In some embodiments, one or more of the first opening 30, the second opening 32, the third opening 34, and the fourth opening 36 may include a generally horizontal slit. In some embodiments, the first opening 30 may extend along a portion of a lower edge of the first section 16 to at least the second section 18. In some embodiments, the first opening 30 may extend along the portion of the lower edge of the first section to the third section 20. In these embodiments, in response to the first section 16 being uncoupled from the second section 18 via the first coupling mechanism and the third section 20 being uncoupled from the second section 18 via the second coupling mechanism, the second section 18 may be detached or removed from the cover 10.

In some embodiments, the second opening 32 may extend along a portion of a lower edge of the third section 20 to at least the second section 18. In some embodiments, the second opening 32 may extend along the portion of the lower edge of the third section 20 to the first section 16. In these embodiments, in response to the third section 20 being uncoupled from the second section 18 via the second coupling mechanism and the first section 16 being uncoupled from the second section 18 via the first coupling mechanism, the second section 18 may be detached or removed from the cover 10. In some embodiments, the first section 16 may be folded over fold line 35 and/or the third section 20 may be folded over fold line 37.

In some embodiments, the third opening 34 may be disposed between the first section 16 and the lower portion 12. In some embodiments, the fourth opening 36 may be disposed between the third section 20 and the lower portion 12. In some embodiments, the first opening 34 and/or the fourth opening 36 may be configured to receive a seat belt and/or a fastener used to anchor a child car seat.

In some embodiments, the cover 10 may be constructed of a fabric material, such as, for example, one or more of the following: spandex knit, lycra knit, jersey knit, interlock knit, ribbed knit, terry knit, sweater knit, modal knit, hemp knit, bamboo knit, silk knit, cotton knit, ponte de roma, thermal knit, stretch lace, synthetic knit, organic knit, polyvinyl chloride, cotton, nylon, polyester, etc. In some embodiments, the fabric material may be stretchable. In some embodiments, the fabric material may be weatherproof and/or machine-washable. In some embodiments, the cover 10 may include a guard portion 38, which may be coupled to a lower edge 40 of the lower portion 12. In some embodiments, when the cover 10 is used as the cargo bed cover, the guard portion 38 may be configured to extend over a bumper of the vehicle. In some embodiments, when the cover 10 is used as the seat cover, the guard portion 38 may be configured to extend vertically and/or generally perpendicularly from the lower portion 12. In some embodiments, the guard portion 38 may include one or more fasteners 42, which may be configured to secure the cover 10 to the seat of the vehicle. Each of the fasteners 42 may include any suitable means of securing the cover 10 to the seat. For example, as illustrated in FIG. 1, each of the fasteners 42 may include a belt, which may be configured to form a loop around a portion of the seat, such as a leg. In some embodiments, the loop may include a clasp.

In some embodiments, the cover may be configured to hang similar to a hammock between one or more headrests disposed on front seats of the vehicle and one or more headrests disposed on back seats of the vehicle. For example, each of the fasteners 28 may be coupled with the head rests disposed on the front seats of the vehicle and each of the fasteners 42 may be coupled with the head rests disposed on the back seats of the vehicle. In these embodiments, the lower portion 12 may hang lower than then upper portion 14 and/or the guard portion 38.

Figure 2:
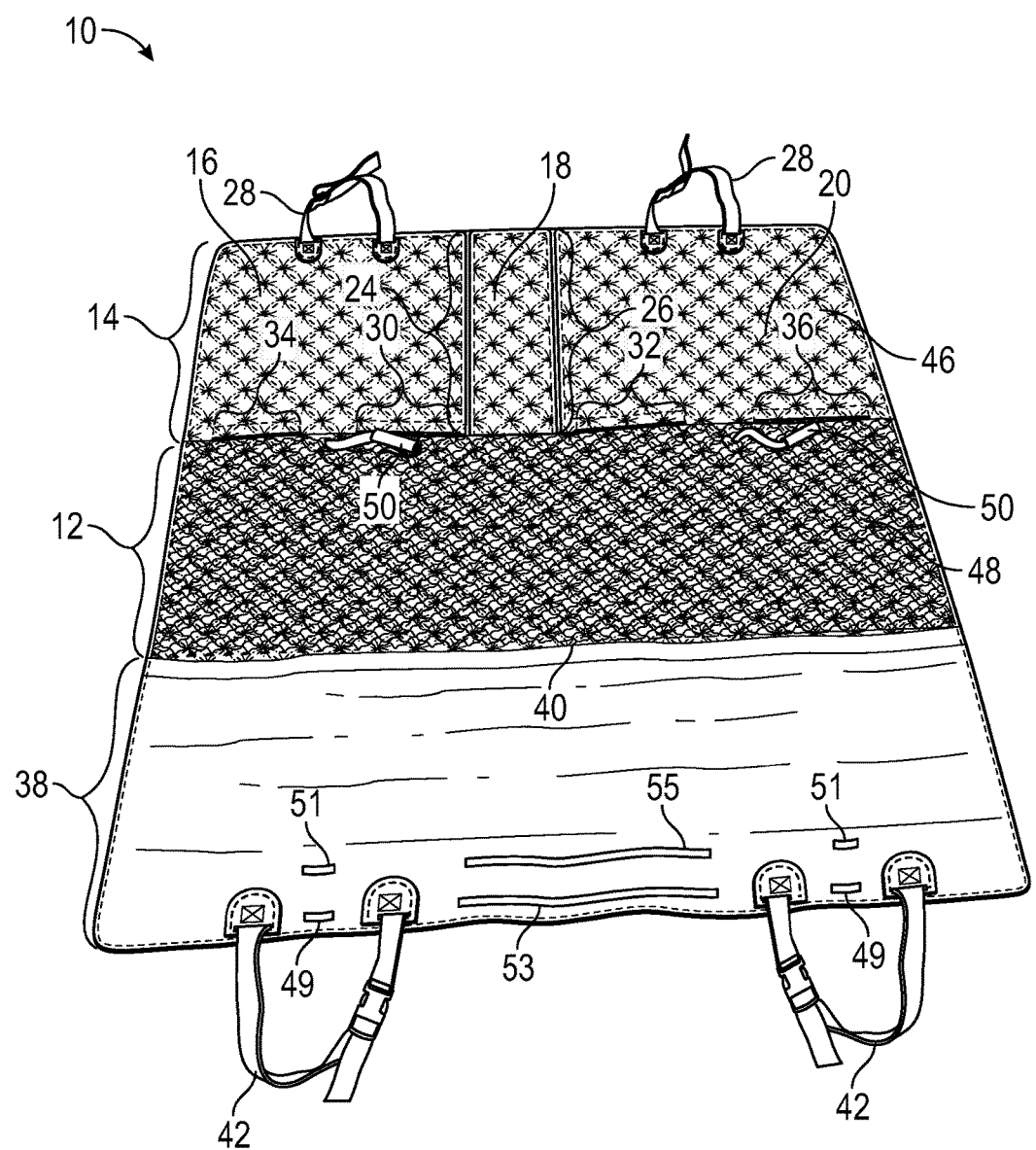
FIG. 2 is a bottom view of the example cover of FIG. 1, according to some embodiments.

Referring now to FIGS. 1 and 2, in some embodiments, the cover 10 may include a first layer 44 of the fabric material and a second layer 46 of the fabric material, which may be sewn together. In some embodiments, padding may be disposed between at least a portion of the first and second layers 44, 46 of the fabric material. In some embodiments, the guard portion 38 may or may not include the padding. In some embodiments, the guard portion 38 may include a single layer of the fabric material.

Referring now to FIG. 2, in some embodiments, the cover 10 may include another layer or backing layer 48, which may be disposed on at least a portion of an underside of the cover 10. For example, the backing layer 48 may be disposed on an underside of the lower portion 12 and/or the upper portion 14. In some embodiments, when the cover 10 is used as the cargo bed cover, the backing layer 48 may be disposed on an underside of the lower and upper portions 12, 14. In some embodiments, when the cover 10 is used as the seat cover, the backing layer 48 may be disposed on an underside of the lower portion 12. In some embodiments, the backing layer 48 may be configured to prevent slippage and/or increase friction between the cover 10 and the seat and/or the cargo bed. In some embodiments, the backing layer 48 may include a netting. In some embodiments, the backing layer 48 may be constructed of rubber, plastic, or another suitable material that allows the cover 10 to be flexible and/or foldable. In some embodiments, the cover 10 may include a water-proof coating. In some embodiments, one or more anchors 50 may be coupled to the underside of the cover 10. In some embodiments, the anchors 50 may be configured to be tucked into a crease in the seat between the backrest and the bench of the seat. In some embodiments, the anchors 50 may be looped-shaped.

In some embodiments, one or more of the following may extend along substantially all of a height of the upper portion 14: the first vertical slit 24, the second vertical slit 26, the first coupling mechanism, and the second coupling mechanism.

In some embodiments, the guard portion 38 may include one or more guard coupling mechanisms, which may allow all or a portion of the guard portion 38 to be securely rolled or folded. In some embodiments, the one or more guard coupling mechanisms may be disposed on a bottom or underside of the guard portion 38. In some embodiments, each of the fasteners 42 may be folded such that a middle portion of the fastener 42 is disposed between a first guard coupling mechanism 49 and a second guard coupling mechanism 51. In some embodiments, the first and second guard coupling mechanisms 49, 51 may then be coupled together and the guard portion 38 folded such that the fastener 42 is secured within the guard portion 38.

Additionally or alternatively, in some embodiments, a third guard coupling mechanism 53 may extend along all or a portion of an edge of the guard portion 38. In some embodiments, the third guard coupling mechanism 53 may be coupled with a corresponding fourth guard mechanism 55. In some embodiments, the third guard coupling mechanism 53 and/or the corresponding fourth guard coupling mechanism 55 may prevent the guard portion 38 from sagging when the guard portion 38 is rolled or folded.

In some embodiments, a particular guard coupling mechanism 53 may be configured to couple with a particular fastener 42. For example, the particular guard coupling mechanism 53 may be a loop and the particular fastener 42 may be secured within the loop. In these and other embodiments, a single guard coupling mechanism may secure the particular fastener 42.

The guard coupling mechanisms illustrated in FIG. 2B are VELCRO™ However, the guard coupling mechanisms 49, 51, 53, 55 may each include any suitable coupling mechanism, such as for example, one or more buttons, snaps, magnets, clasps, eyelets, hooks, VELCRO™, etc. The guard coupling mechanisms may be disposed at any number of locations on the underside of the guard portion 38 to allow the guard portion to be rolled or folded.

Figure 3:
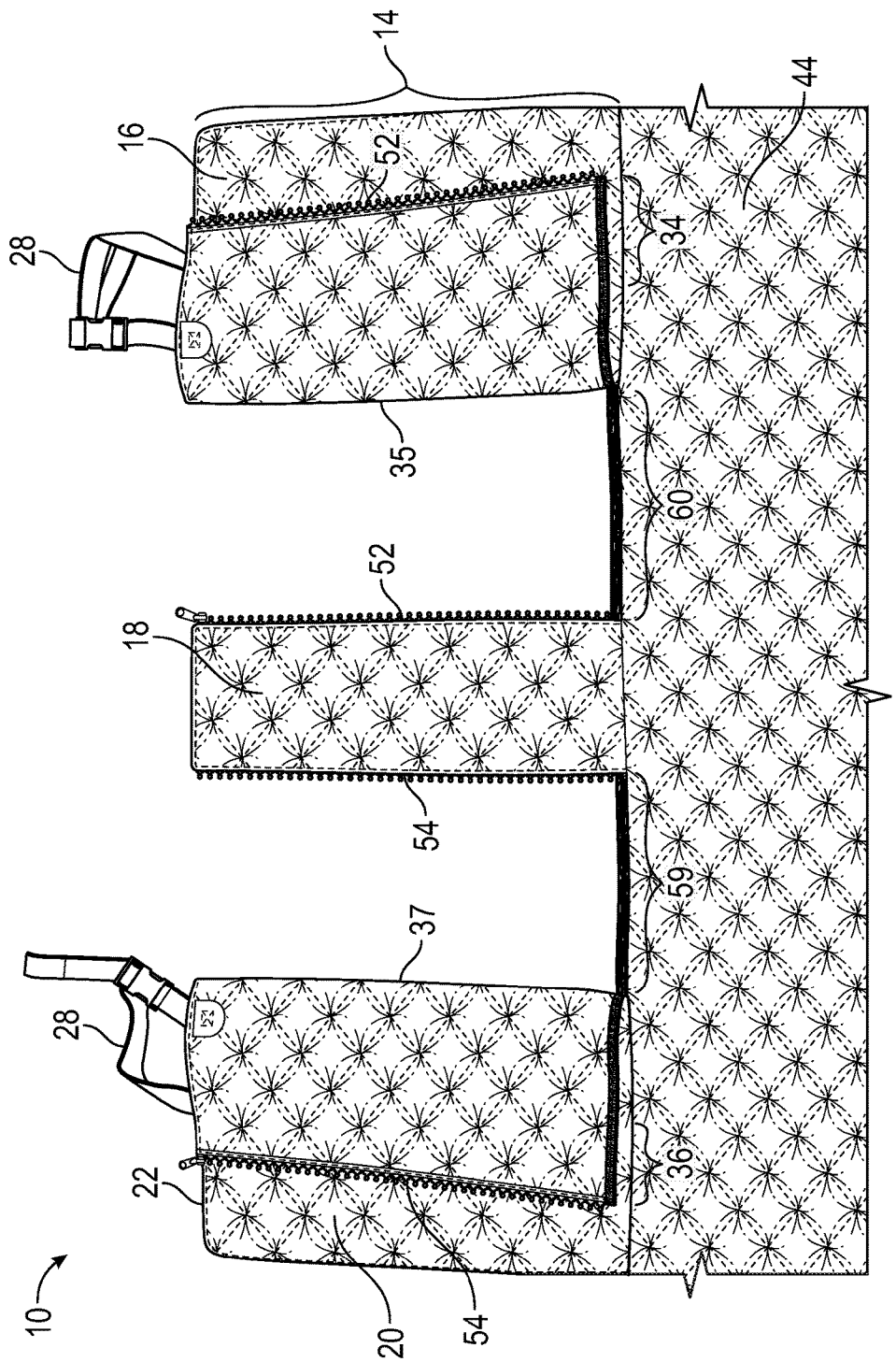
FIG. 3 is a top view of a portion of the example cover of FIG. 1, illustrating a first section and a third section of an upper portion of the cover uncoupled from a second portion of the upper portion via the first and second coupling mechanisms.

Referring now to FIG. 3, in some embodiments, the first coupling mechanism 52 may extend along at least a portion of the first vertical slit 24 and/or the second coupling mechanism 54 may extend along at least a portion of the second vertical slit 26. The first and second coupling mechanisms 52, 54 may each include any suitable coupling mechanism, such as for example, one or more buttons, snaps, magnets, clasps, eyelets, hooks, VELCRO™, etc. In some embodiments, the first and second coupling mechanisms 52, 54 may include zippers, as illustrated in FIG. 3.

In some embodiments, a third coupling mechanism 60 may be configured to at least partially close the first opening 30. In some embodiments, a fourth coupling mechanism 59 may be configured to at least partially close the second opening 32. In some embodiments, the third coupling mechanism 60 may extend along at least a portion of the first opening 30. In some embodiments, the fourth coupling mechanism 59 may extend along at least a portion of the second opening 32. In some embodiments, the third coupling mechanism 60 and/or the fourth coupling mechanism 59 may each include any suitable coupling mechanism, such as for example, one or more buttons, snaps, magnets, clasps, etc. In some embodiments, the third coupling mechanism 60 and/or the fourth coupling mechanism may be disposed in a crease or seam between the lower portion 12 and the upper portion 14.

In some embodiments, the third coupling mechanism 60 and/or the fourth coupling mechanism 59 may include VELCRO™, as illustrated in FIG. 3, which may allow the first opening 30 and/or the second opening 32 to partially open to access a seatbelt. Coupling mechanisms the same as or similar to the first coupling mechanism 52, the second coupling mechanism 54, the third coupling mechanism 60, or the fourth coupling mechanism 59, may be used to close or partially close the third opening 34 and/or the fourth opening 36. In some embodiments, one or more of the following may be eliminated: the first coupling mechanism 52, the second coupling mechanism 54, the third coupling mechanism 60, and the fourth coupling mechanism 59. In some embodiments, the cover 10 may not include one or more of the following: the first coupling mechanism 52, the second coupling mechanism 54, the third coupling mechanism 59, and the fourth coupling mechanism 60.

Figure 4:
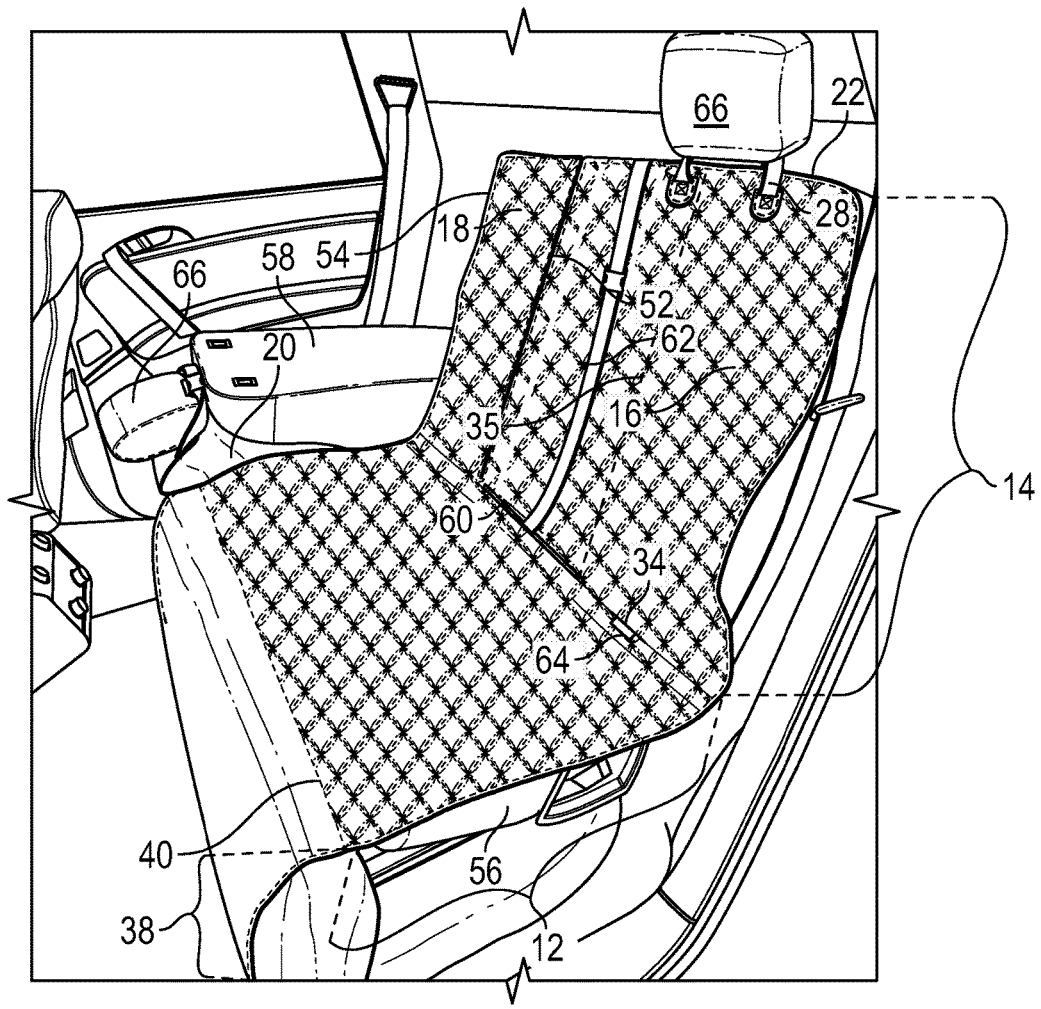
FIG. 4 is an upper perspective view of the cover of FIG. 1, illustrating the cover extending over a bench and backrest of a vehicle seat in one configuration, according to some embodiments.
Figure 5:
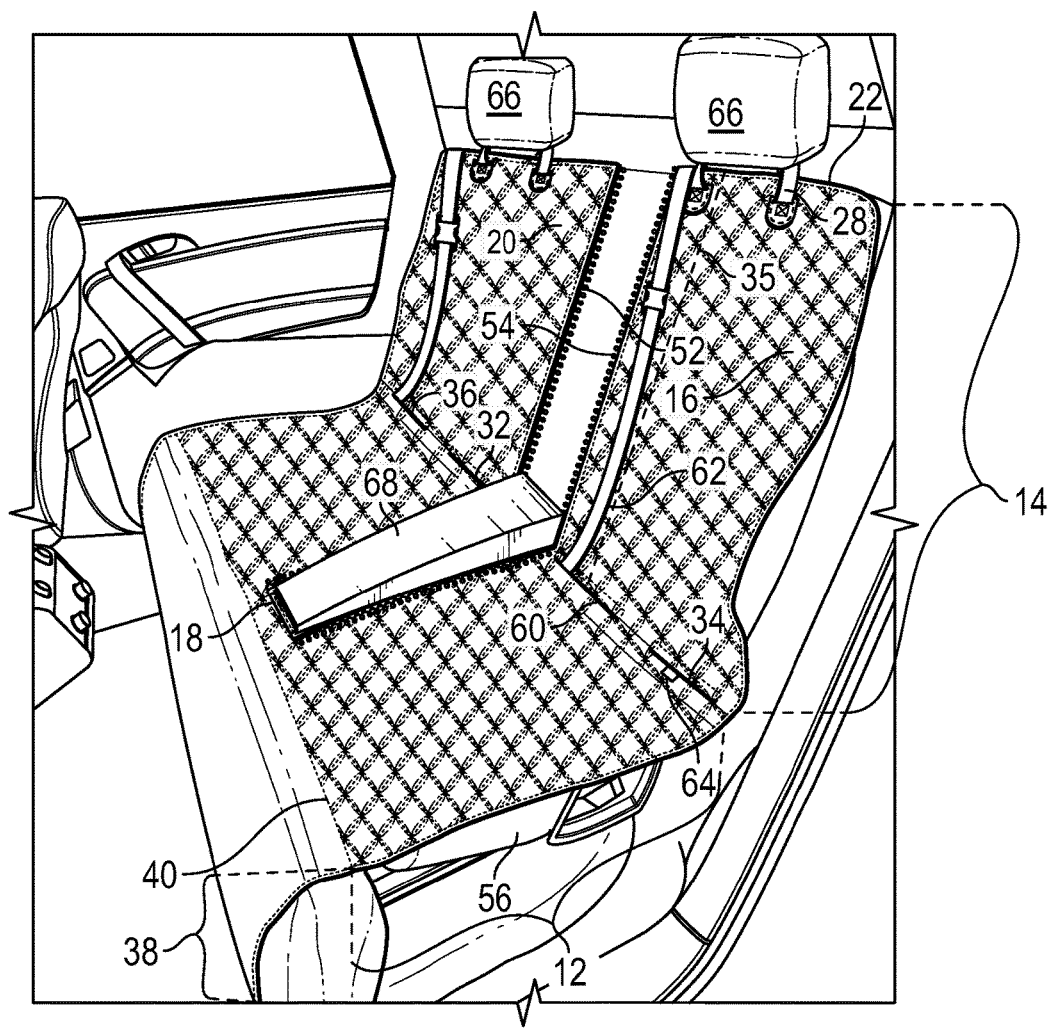
FIG. 5 is an upper perspective view of the cover of FIG. 1, illustrating the cover extending over the bench and the backrest of the vehicle seat in another configuration, according to some embodiments.
Figure 6:
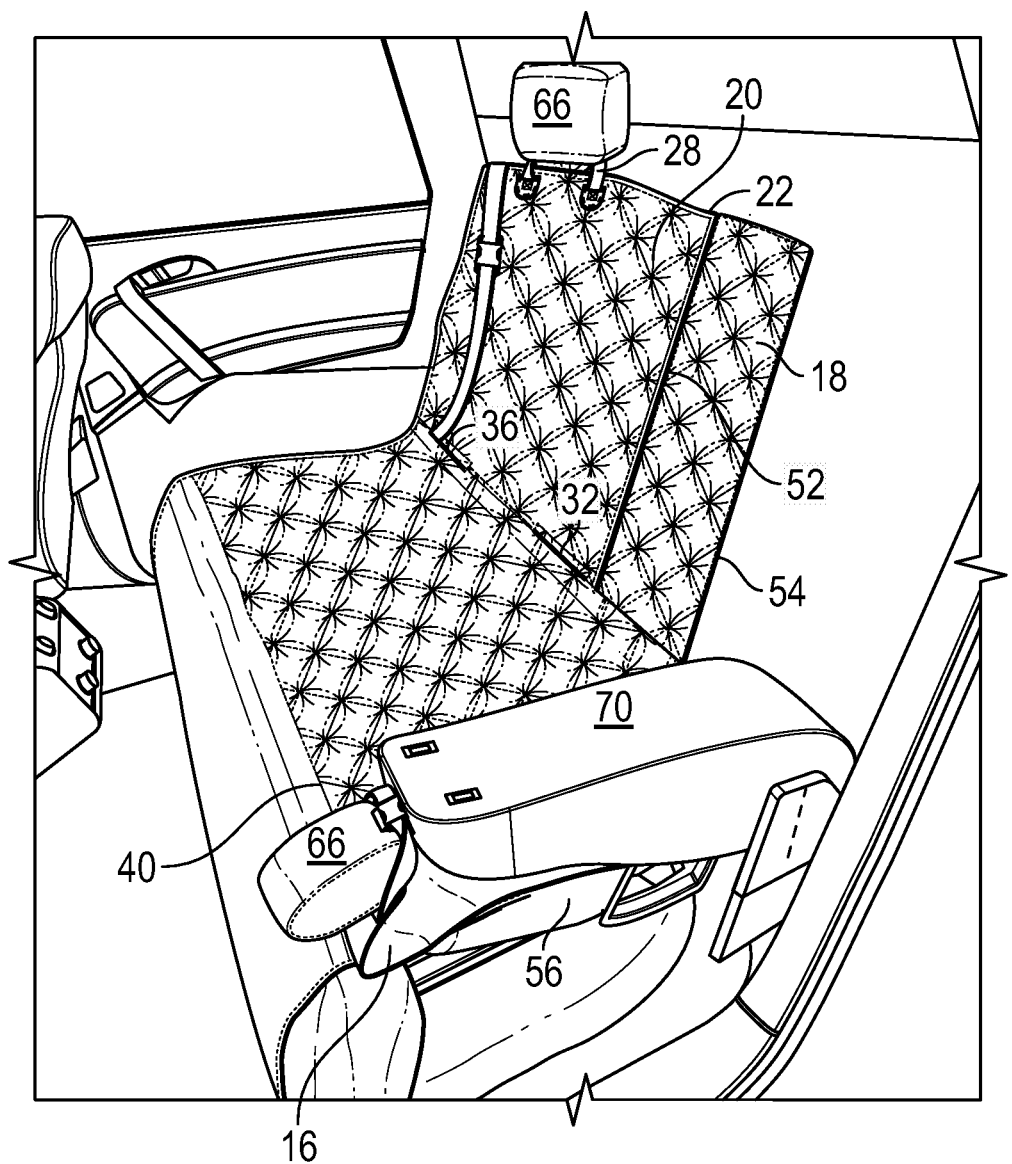
FIG. 6 is an upper perspective view of the cover of FIG. 1, illustrating the cover extending over the bench and the backrest of the vehicle seat in another configuration, according to some embodiments.

Referring now to FIGS. 4-6, in some embodiments, the lower portion 12 may be sized and configured to extend over a horizontally-oriented top of a bench 56 of a vehicle seat. In some embodiments, a third section 58 of the backrest may be configured to be folded on top of the lower portion 12 independently of the first and second sections 16, 18 in response to the third section 20 being uncoupled from the second section 18 via the second coupling mechanism 54. In some embodiments, when the cover 10 is used as the seat cover, the third section 20 may be configured to be folded on top of the lower portion 12 independently of the first and second sections 16, 18 in response to the third section 20 being uncoupled from the second section 18 via the second coupling mechanism 54 and/or the third portion 58 of the backrest being moved to a folded position.

In some embodiments, the third coupling mechanism 60 may be configured to at least partially close the first opening 30. In some embodiments, as illustrated in FIG. 4, the third coupling mechanism 60 may be configured to partially close the first opening 30 such that a seat belt 62 may extend through the first opening 30. In some embodiments, the fourth coupling mechanism 59 may configured the same as or similar to the third coupling mechanism 60.

In some embodiments, a fastener 64 may be configured to, for example, anchor a child car seat and may extend through the third opening 34 and/or the fourth opening 36. In some embodiments, each of the fasteners 28 may be configured to secure the cover 10 to a headrest 66 of the vehicle.

As illustrated in FIG. 5, in some embodiments, the second section 18 may be configured to be folded on top of the lower portion 12 independently of the first and third sections 16, 20 in response to the first section 16 being uncoupled from the second section 18 via the first coupling mechanism 52 and the third section 20 being uncoupled from the second section 18 via the second coupling mechanism 54. In some embodiments, when the cover 10 is used as the seat cover, the second section 18 may be configured to be folded on top of the lower portion 12 independently of the first and third sections 16, 20 in response to the first section 16 being uncoupled from the second section 18 via the first coupling mechanism 52 and the third section 54 being uncoupled from the second section 18 via the second coupling mechanism 54, and further in response to a second portion 68 of the back rest being moved to a folded position, as illustrated in FIG. 5. In some embodiments, the second portion 68 of may correspond to an arm rest or a person location.

As illustrated in FIG. 6, in some embodiments, the first section 16 may be configured to be folded on top of the lower portion 12 independently of the second and third sections 18, 20 in response to the first section 16 being uncoupled from the second section 18 via the first coupling mechanism 52. In some embodiments, when the cover 10 is used as the seat cover, the first section 16 may be configured to be folded on top of the lower portion 12 independently of the second and third sections 18, 20 in response to the first section 16 being uncoupled from the second section 18 via the first coupling mechanism 52 and/or a first section 70 of the backrest being moved to a folded position.

Figure 7:
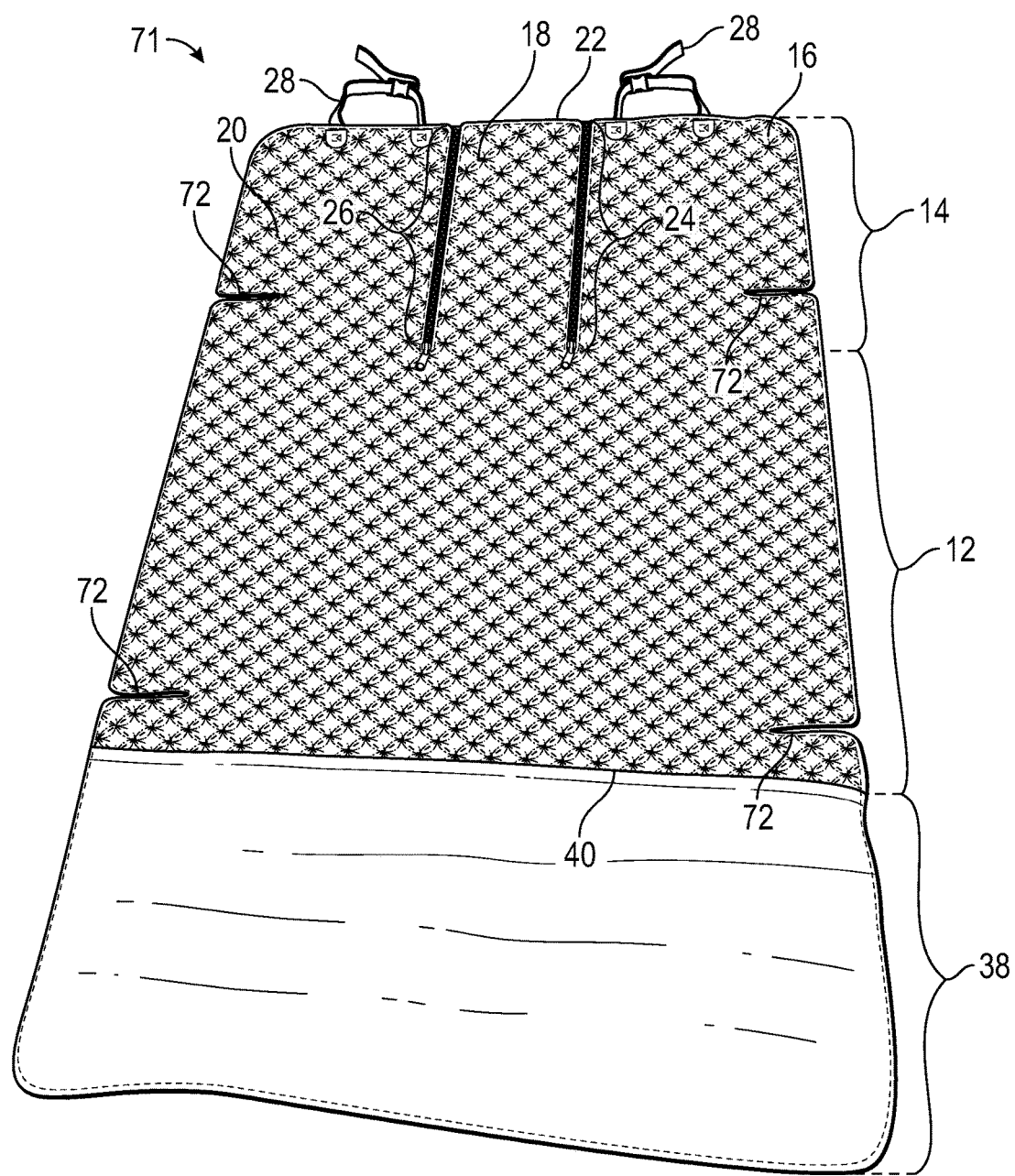
FIG. 7 is a top view of another example cover, according to some embodiments.

Referring now to FIG. 7, in some embodiments, a cover 71 may include the cargo bed cover. In some embodiments, the cover 71 may include or correspond to the cover 10 described in the previous figures. In some embodiments, one or more of the first opening 30, the second opening 32, the third opening 34, and the fourth opening 36 may be absent when the cover 71 includes the cargo bed cover, as illustrated in FIG. 7. In some embodiments, edges of the lower and upper portions 12, 14 may include slits 72 configured to facilitate folding of the cover 10 to cover portions of a side wall of the interior of the vehicle proximate the cargo bed. In some embodiments, the edges of the cover 71 may include any number of slits 72, which may be positioned at various locations. In some embodiments, the slits 72 may be configured to allow one or more wings 75 to be folded upward. In some embodiments, the wings 75 may allow the cover 71 to be fitted to various cargo areas and vehicles. Thus, the wings 75 may facilitate universal usage of the cover 71. For example, a particular cargo area may include a protrusion, such as a tire well, and the wings 75 may be configured to allow the cover 71 to bend around the protrusion. In some embodiments, the cover 71 may include four slits 72, as illustrated in FIG. 7. In some embodiments, the cover 71 may have less than or more than four slits 72. In some embodiments, one or more coupling mechanisms may at least partially close one or more of the slits 72, which may increase a length of a particular wing 75.

Figure 8:
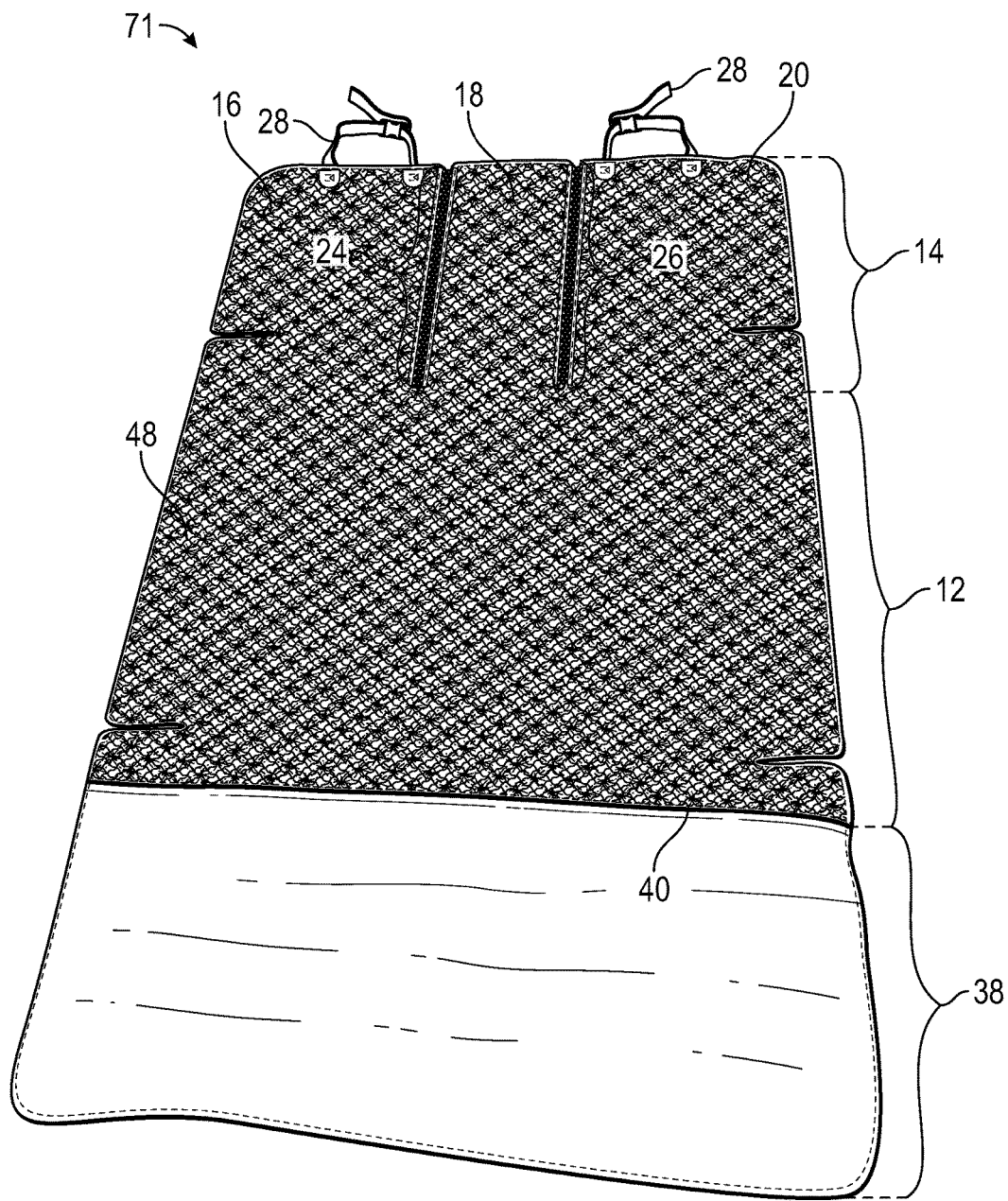
FIG. 8 is a bottom view of the example cover of FIG. 7, according to some embodiments.

Referring now to FIG. 8, in some embodiments, when the cover 71 is used as the cargo bed cover, the backing layer 48 may be disposed on an underside of the lower and upper portions 12, 14.

Figure 9:
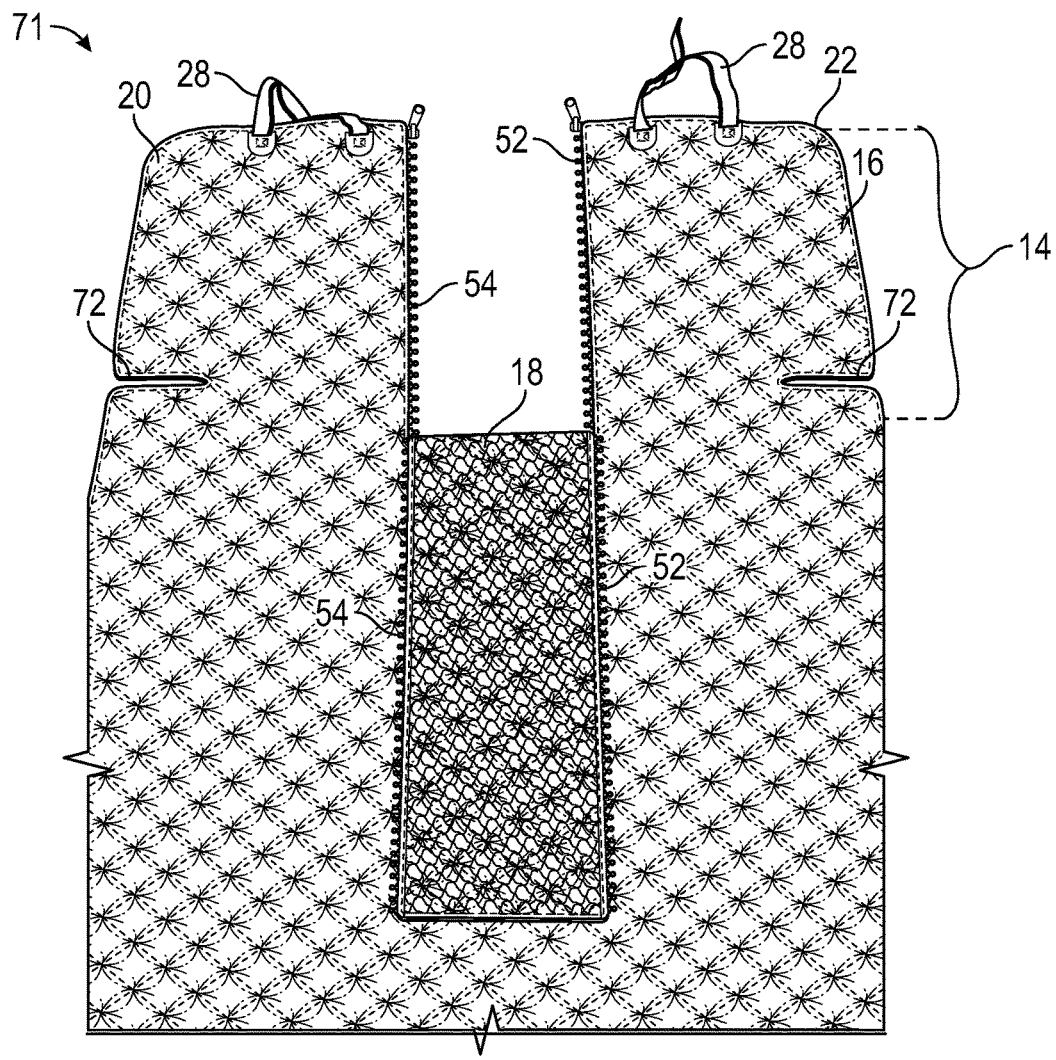
FIG. 9 is top view of a portion of the example cover of FIG. 7, illustrating a first section and a third section of an upper portion of the cover uncoupled from a second portion of the upper portion via the first and second coupling mechanisms, according to some embodiments.
Figure 10:
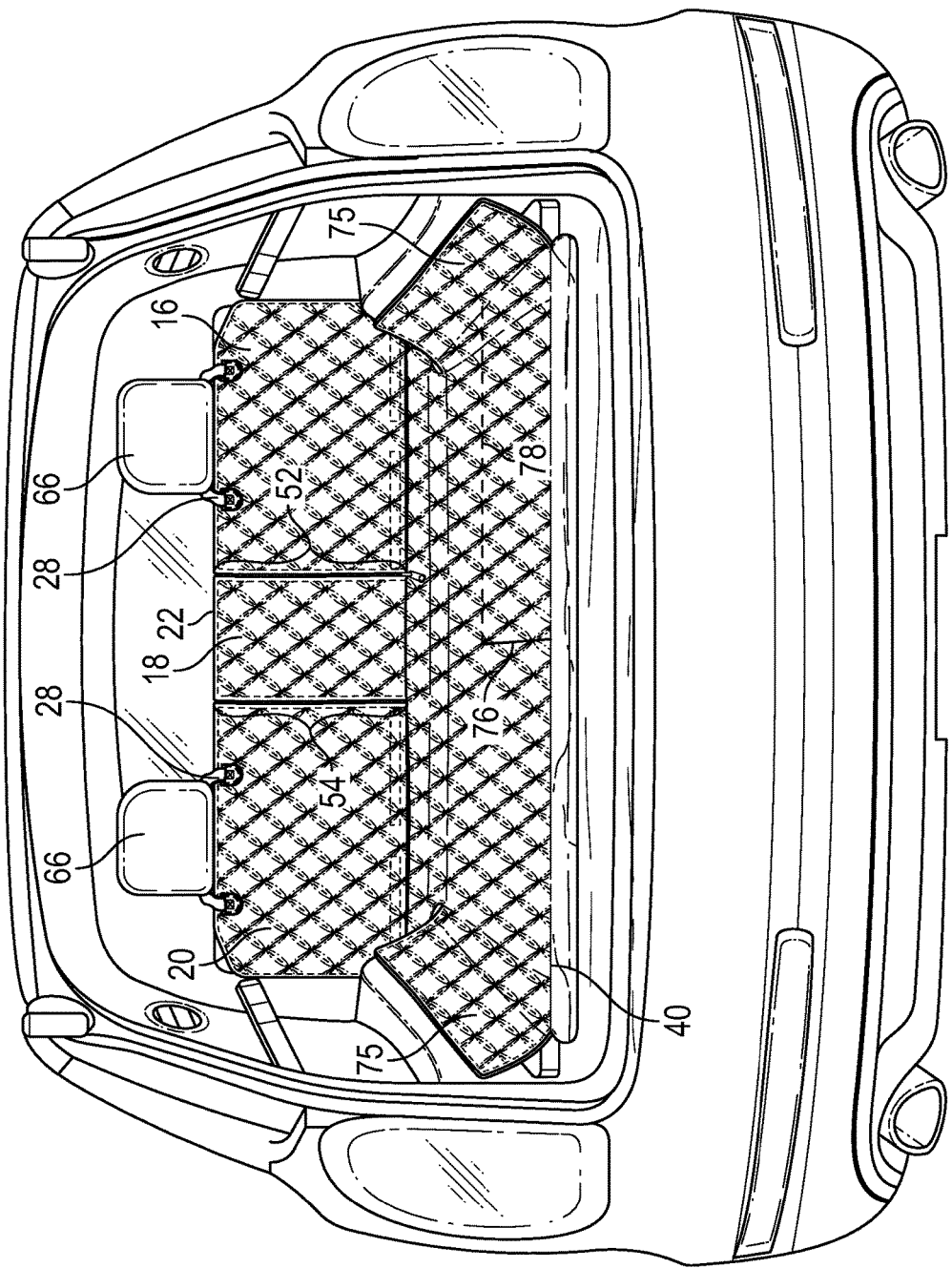
FIG. 10 is an upper perspective view of the cover of FIG. 7, illustrating the cover extending over a rear surface of a backrest of a vehicle seat and a cargo area in one configuration, according to some embodiments.

Referring now to FIG. 9, any or all of the first section 16, the second section 18, and the third section 20 may be configured to fold along an edge between the upper portion 14 and the lower portion 12. FIG. 9 illustrates the second section 18 independently folded on top of the lower portion 12.

Referring now to FIGS. 10-13, in some embodiments, the lower portion 12 may be sized and configured to extend over a horizontally-oriented cargo area of the vehicle. In some embodiments, the upper portion 14 may be sized and configured to extend upwardly over a backrest of the vehicle seat. In some embodiments, the upper portion 14 may be sized and configured to extend upwardly over a rear surface of the backrest.

In some embodiments, the lower portion 12 may include a slit 76, which may extend linearly inward from the lower edge 40 of the lower portion 12. The slit 76 may allow a section of the lower portion 12 to be folded over fold line 78 to expose a portion of a floor of the cargo bay. In some embodiments, the slit may extend linearly inward from a center of the lower edge of the lower portion.

Figure 11:
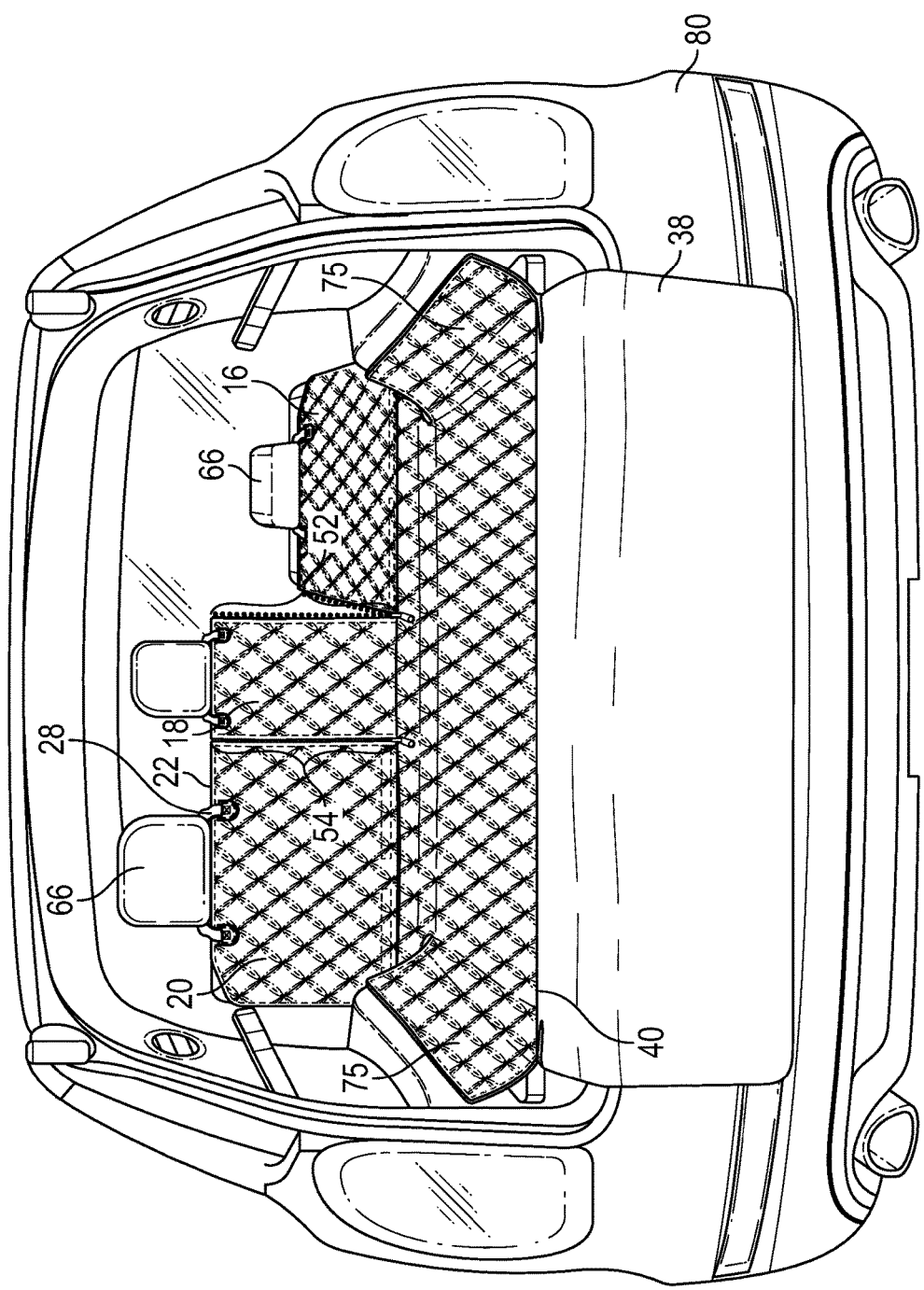
FIG. 11 is an upper perspective view of the cover of FIG. 7, illustrating the cover extending over the rear surface of the backrest and the cargo area in another configuration.

Referring now to FIG. 11, in some embodiments, the first section 16 may be configured to move to a generally horizontal position independently of the second and third sections 18, 20 in response to the first section 16 being uncoupled from the second section 18 via the first coupling mechanism 52 and/or the third section 58 of the backrest being moved to a folded position, as illustrated in FIG. 11. In some embodiments, when the cover 71 is used as the cargo bed cover, the guard portion 38 may be configured to extend over a bumper 80 of the vehicle.

Figure 12:
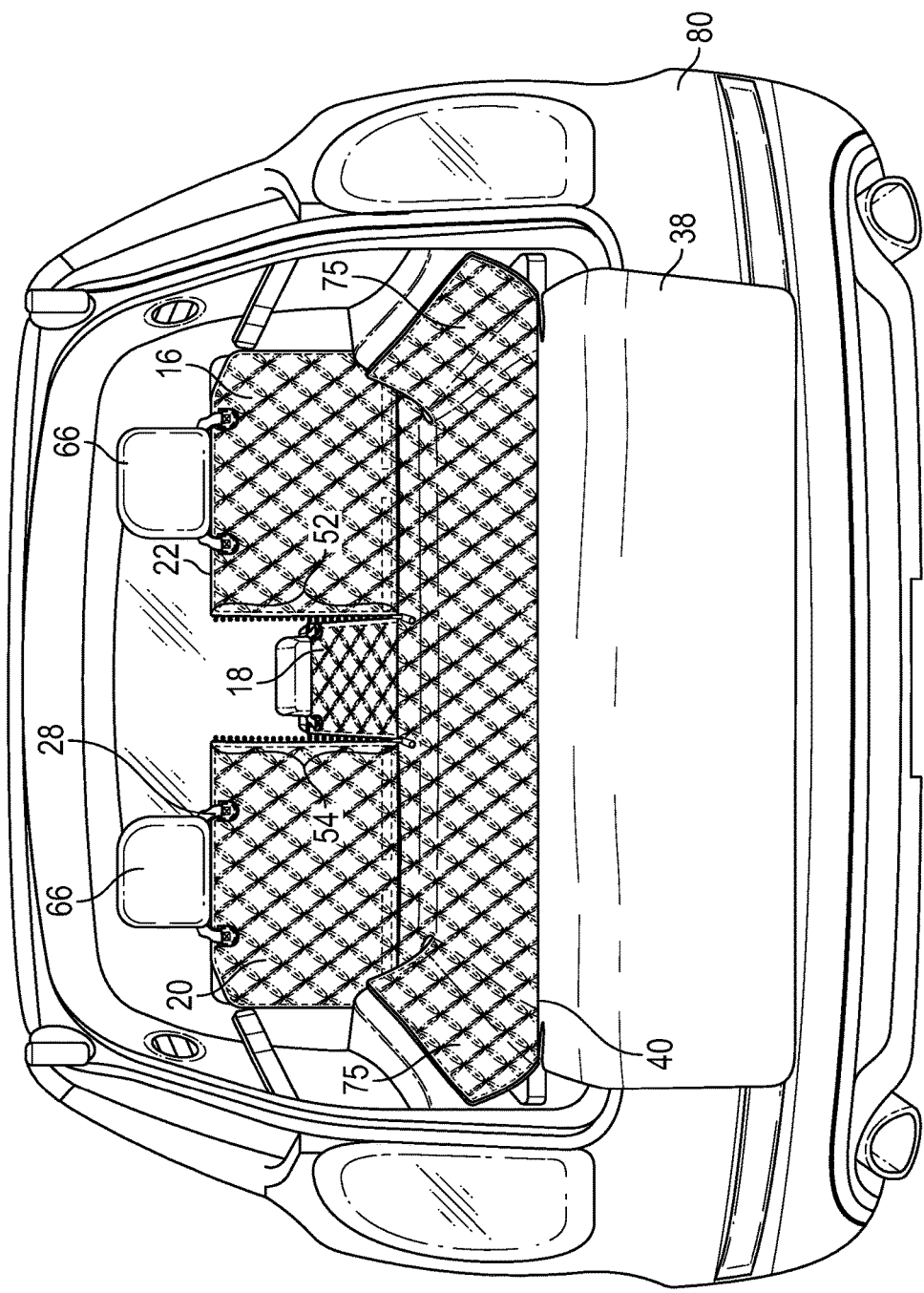
FIG. 12 is an upper perspective view of the cover of FIG. 7, illustrating the cover extending over the rear surface of the backrest and the cargo area in another configuration, according to some embodiments, according to some embodiments.

Referring now to FIG. 12, in some embodiments, the second section 18 may be configured to move to a generally horizontal position independently of the first and third sections 16, 20 in response to the first section 16 being uncoupled from the second section 18 via the first coupling mechanism 52 and the third section 20 being uncoupled from the second section 18 via the second coupling mechanism 54, and further in response to the second portion 68 of the back rest being moved to the folded position.

Figure 13:
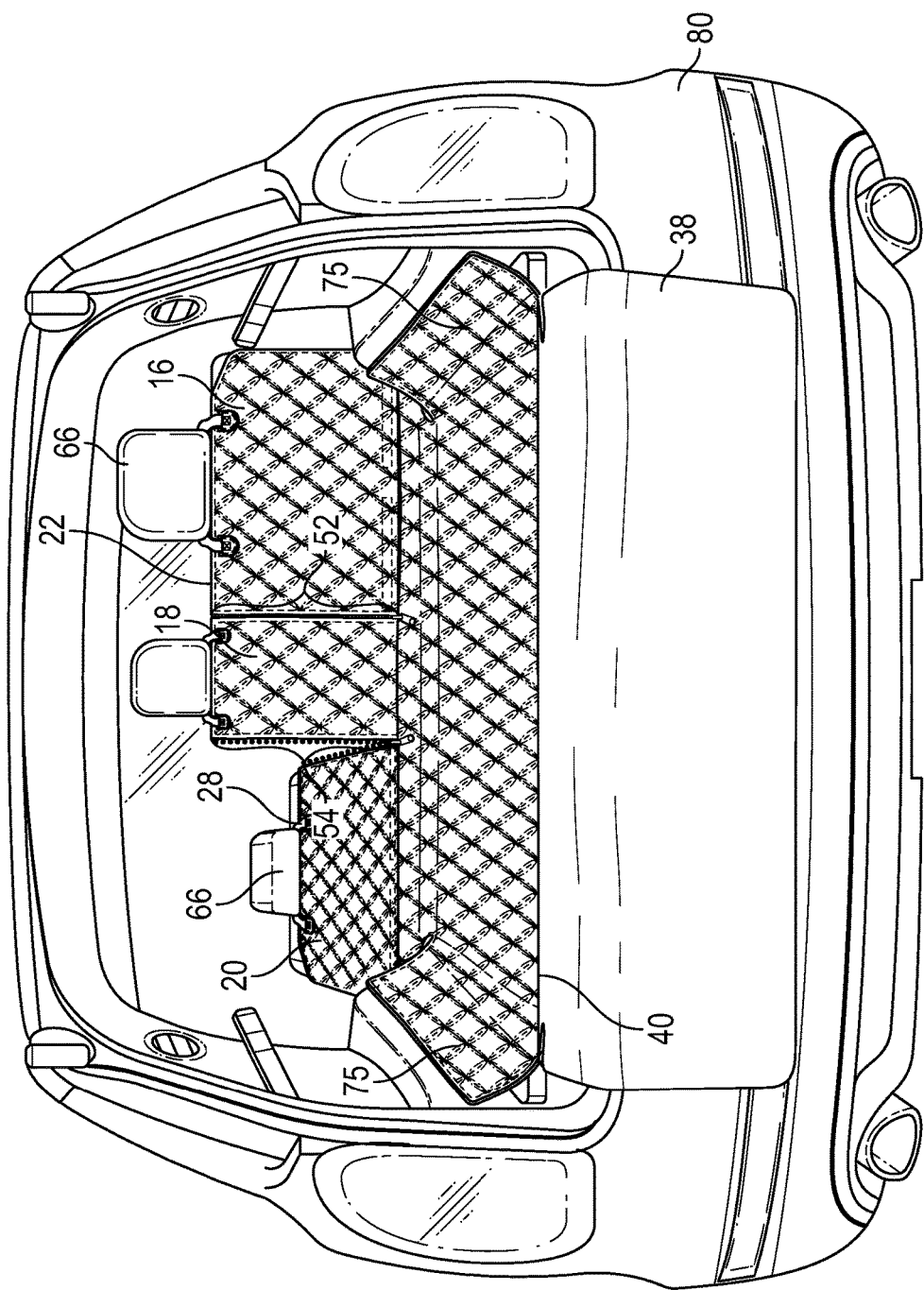
FIG. 13 is an upper perspective view of the cover of FIG. 7, illustrating the cover extending over the rear surface of the backrest and the cargo area in another configuration, according to some embodiments.

Referring now to FIG. 13, in some embodiments, the third section 20 may be configured to move to a generally horizontal position independently of the first and second sections 16, 18 in response to the third section 20 being uncoupled from the second section 18 via the second coupling mechanism 54 and/or the first section 70 of the back rest being moved to the folded position.

Figure 14:
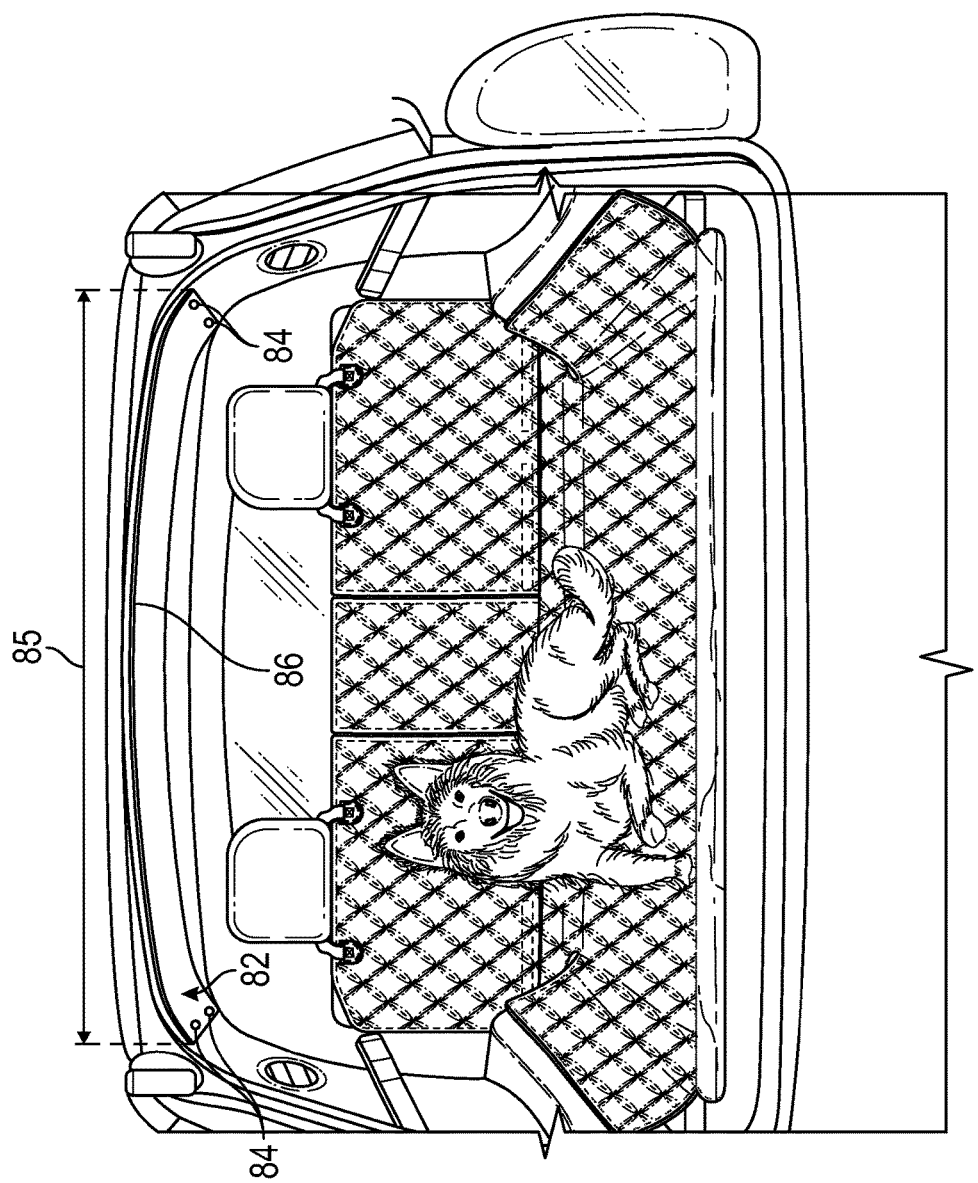
FIG. 14 is a lower perspective view of an example head liner cover, according to some embodiments.

Referring now to FIG. 14, in some embodiments, a cargo bed cover system may include a head liner cover 82 and/or the cover 71. In some embodiments, the head liner cover 82 may include one or more fasteners 84 coupled to an interior of the vehicle. In some embodiments, the head liner cover 82 may be disposed above the cargo bed of the vehicle. The head liner cover 82, however, may be disposed on any portion of the ceiling and/or one or more upper side walls of the vehicle. In some embodiments, the interior of the vehicle may include the ceiling and/or the upper side walls.

Figure 15:
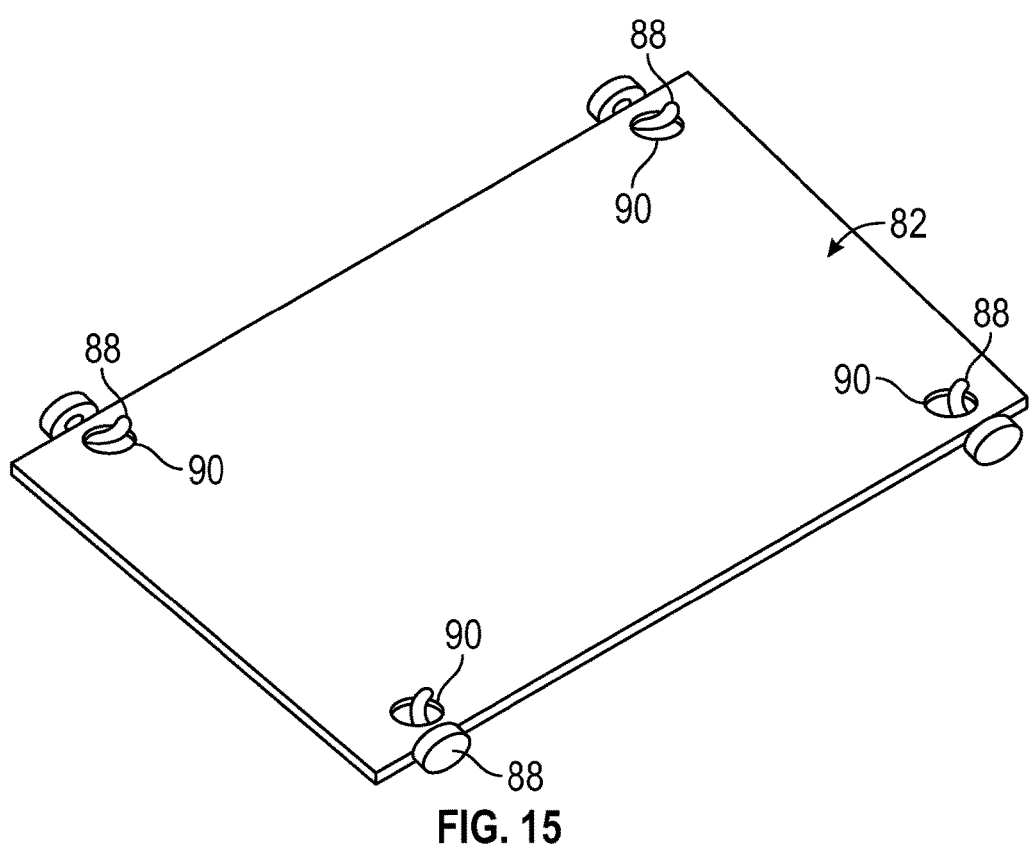
FIG. 15 is an upper perspective view of the example head liner cover of FIG. 14, illustrating one or more fasteners, according to some embodiments.

In some embodiments, the head liner cover 82 may include an elongated fabric material, which may have a length approximately equal to or slightly longer than a width 85 of the ceiling. In some embodiments, the one or more fasteners 84 may be configured to secure the fabric material at least proximate the ceiling. In some embodiments, the fabric material may be spaced apart and/or touch the ceiling. The one or more fasteners 84 may each include a hook, a button, a zipper, a snap, a magnet, a clasp, eyelets, hooks, VELCRO™, or another suitable fastener. In some embodiments, an adhesive may be used to secure the fabric material at least proximate the ceiling. The fasteners 84 may be coupled with any portion of the head liner cover 82. For example, referring now to FIG. 15, the fasteners 84 may be coupled with corners of the head liner cover 82, as illustrated in FIG. 15. In some embodiments, the fasteners may include hooks 88, which may be disposed in holes 90 of the head liner cover 82 to secure the fabric material at least proximate the ceiling. The head liner cover 82 may be permanently or removably coupled with the ceiling and/or upper side walls of the vehicle. In some embodiments, a rear edge 86 of the head liner cover 82 may be disposed at least proximate a top of a hatchback or trunk of the vehicle.

Figure 16:
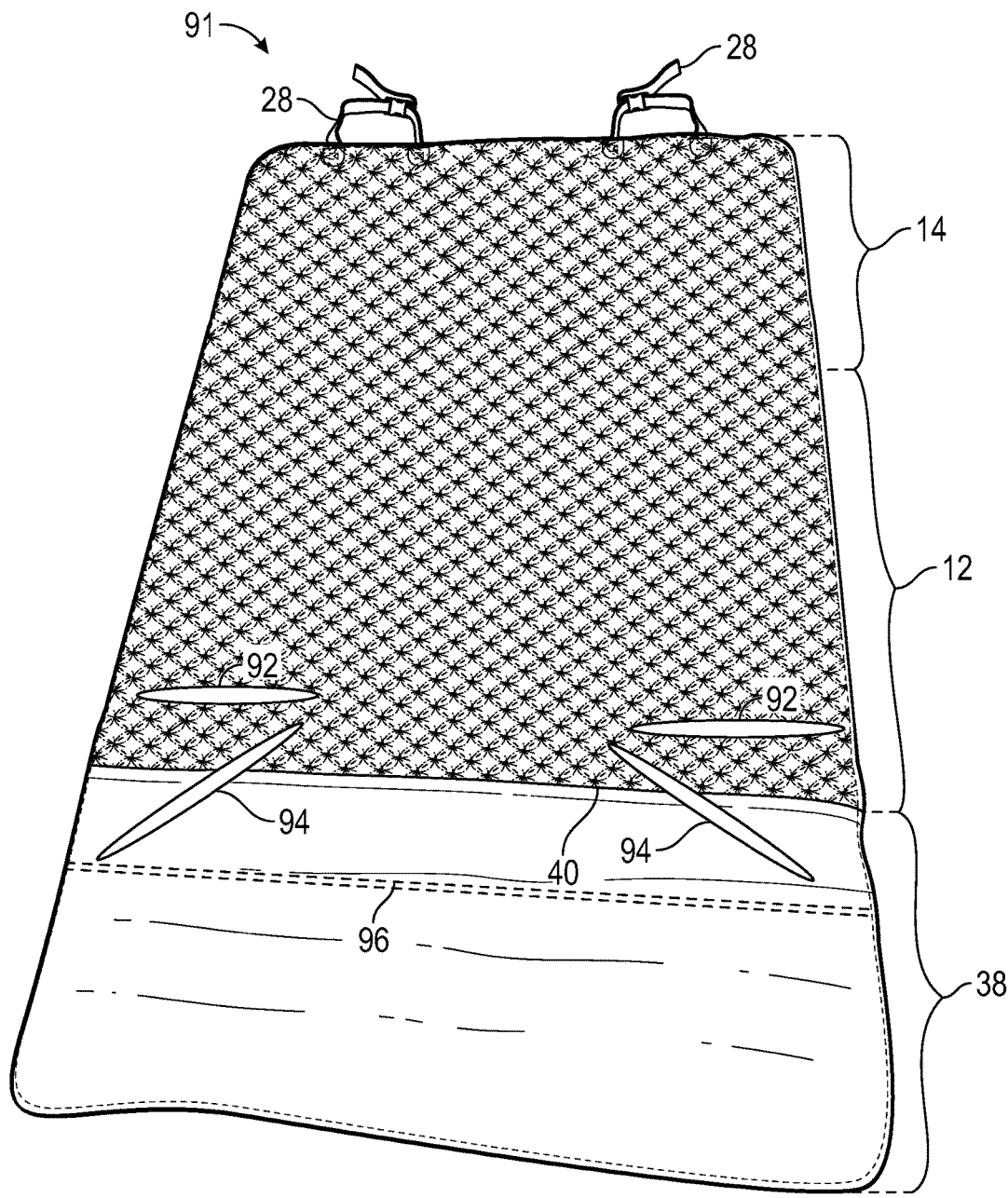
FIG. 16 is a top view of another example cover, according to some embodiments.

Referring now to FIG. 16, in some embodiments, a cover 91 may include the cargo bed cover in which at least a segment of the guard portion 38 can be manipulated into and retained in an elevated state wherein at least a segment of the guard portion 38 extends upwardly to provide a barrier to better retain objects within the vehicle cargo area. In the elevated state, the segment of the guard portion 38 (or, in some embodiments, the entire guard portion 38) serves as a rear barrier to the vehicle cargo area that may at least retain lightweight objects such as sports balls and the like from falling out of the vehicle cargo area. In some embodiments, the rear barrier may retain even heavier objects from falling out of the vehicle cargo area. In some embodiments, the cover 91 may include or correspond to the cover 10 or cover 71 described in the previous figures. The cover 91 includes, however, features providing for manipulation and retention of the segment of the guard portion 38 in the elevated state.

In some embodiments, as illustrated in FIG. 16, a pair of cargo bed coupling mechanisms 92 are disposed on the lower portion 12. Additionally, a pair of guard coupling mechanisms 94 are disposed either entirely on the guard portion 38 or beginning on the lower portion 12 and extending onto the guard portion 38. The cargo bed coupling mechanisms 92 and the respective guard coupling members are configured to mate together and couple the guard portion 38 to the lower portion 12 (and specifically to the wings 75 thereof), whereby a forward segment of the guard portion 38 is accordingly forced to assume an elevated state with the forward segment of the guard portion 38 extending generally upwardly from the lower portion 12 and forms an upward edge approximately at the rearward extend of the guard coupling mechanisms. A rearward segment of the guard portion 38 may be allowed to hang down from the upper edge, either forward of or rearward of the segment of the guard portion 38 extending between the upward edge and the lower portion 12.

In some embodiments, a stiffening material, such as a rod may be affixed to the guard portion 38 (e.g., using ties or other fasteners) or may be contained in a pocket 96 of the guard portion 38. The stiffening rod and/or pocket 96 extends generally across the guard portion 38 rearward of a transition line between the lower portion 12 and the guard portion, and generally proximate the rearward extent of the guard coupling mechanisms 94. The stiffening rod and/or pocket 96 may be located slightly forward of the rearward extent of the guard coupling mechanisms 94, slightly rearward of the rearward extent of the guard coupling mechanisms 94, or generally at the location of the rearward extent of the guard coupling mechanisms 94. In some embodiments, the stiffening rod may be removed from the pocket 96 when the stiffening rod is not needed. The pocket 96 may be formed in or attached to any layer of the cover 91, or may be formed between or attached between any adjacent layers of the cover 91. The stiffening rod may have a length equal to the width of the guard portion 38 at the location of the pocket 96, or it may have a length that is shorter than the width of the guard portion 38 at the location of the pocket 96. In general, the stiffening rod will have a length that is shorter than a width of a rear opening of the vehicle, such that when the guard portion 38 is manipulated between a lowered state in which it is covering the bumper of the vehicle and the elevated state, the stiffening rod will be able to pass through the rear opening of the vehicle.

The stiffening rod, whether affixed to the guard portion 38 or contained in the pocket 96, serves to stiffen the upper edge of the guard portion 38 when the guard portion is manipulated to assume the elevated state. In this way, the segment of the guard portion 38 serving as an elevated retention barrier, will be less susceptible to sagging and allowing objects contained within the vehicle cargo area to fall out of the vehicle cargo area. In some embodiments, the cover 91 may be used with the segment of the rear portion 38 in the elevated state with or without use of the stiffening rod. Use of the stiffening rod simply serves to reduce unwanted sagging of the segment of the guard portion 38 when in the elevated state. If sagging is not a concern, then the cover 91 may be used without the stiffening rod.

Figure 21:
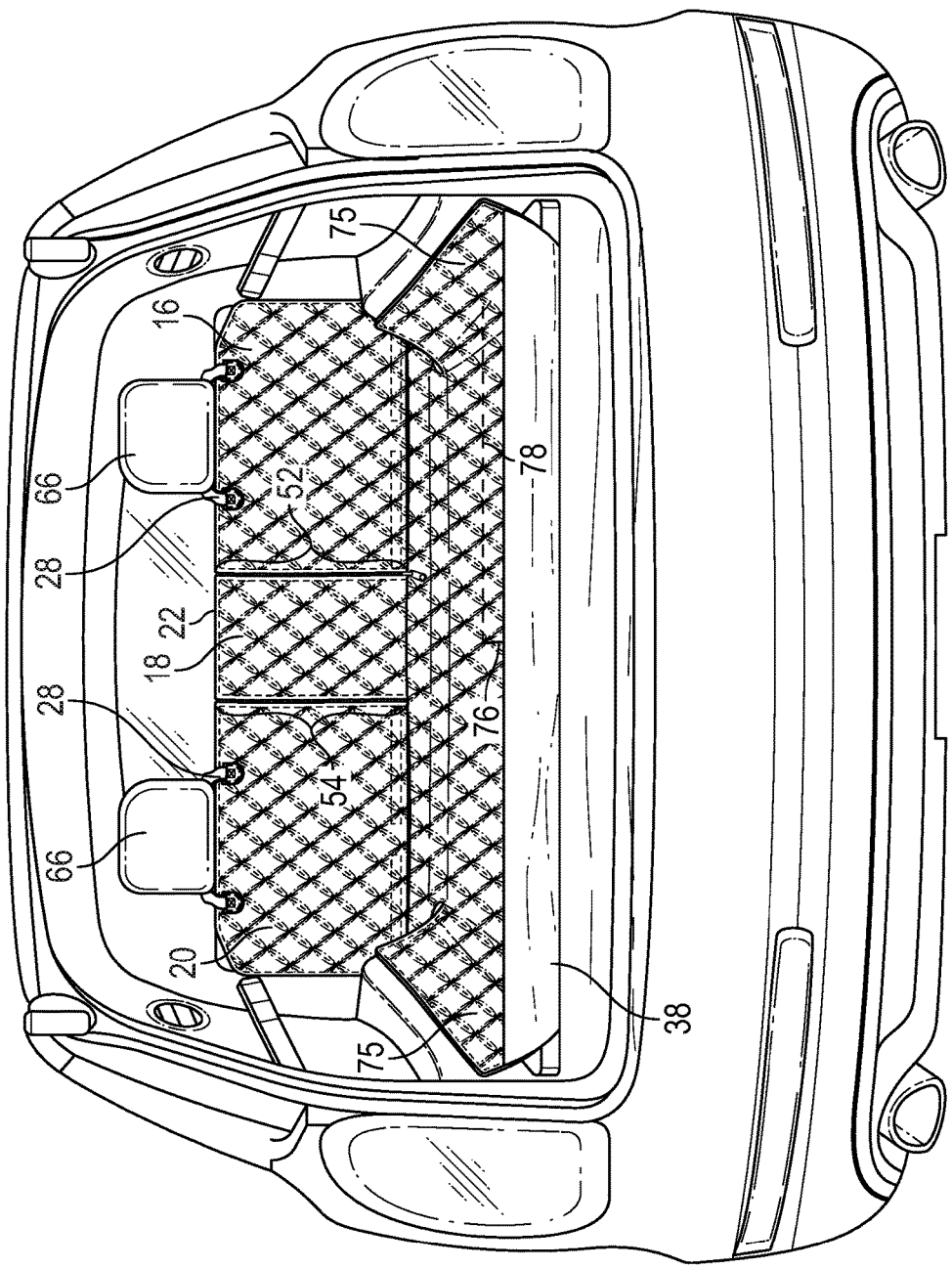
FIG. 21 is an upper perspective view of the cover of FIG. 16, illustrating a segment of the cover being raised into an elevated state to form a rear barrier.

The cargo bed coupling mechanisms 92 and the guard coupling members 94 may be any type of coupling mechanisms, including corresponding hook-and-loop fastener elements (VELCRO™), zippers, buttons, snaps, magnets, clasps, eyelets, hooks, ties, buckles, and the like. One element of a coupling mechanism (e.g., a hook side of a hook-and-loop fastener or one half of a zipper chain) may serve as the cargo bed coupling mechanisms 92, and the other element of a coupling mechanism (e.g., a loop side of a hook-and-loop fastener or the other half a zipper chain) may serve as the guard coupling mechanisms 94. When the cargo bed coupling mechanisms 92 and the guard coupling mechanisms 94 are not coupled or engaged, the guard portion 38 may lie generally flat or in a lowered state, and may be arranged to cover the vehicle bumper, as shown in FIGS. 16 and 11, for example. In contrast, when the cargo bed coupling mechanisms 92 and the guard coupling mechanisms 94 are coupled or engaged, the forward segment of the guard portion 38 will be forced into the elevated state in which the segment extends upwardly from the lower portion 12 to form a rear barrier, as shown in FIG. 21.

Figure 17:
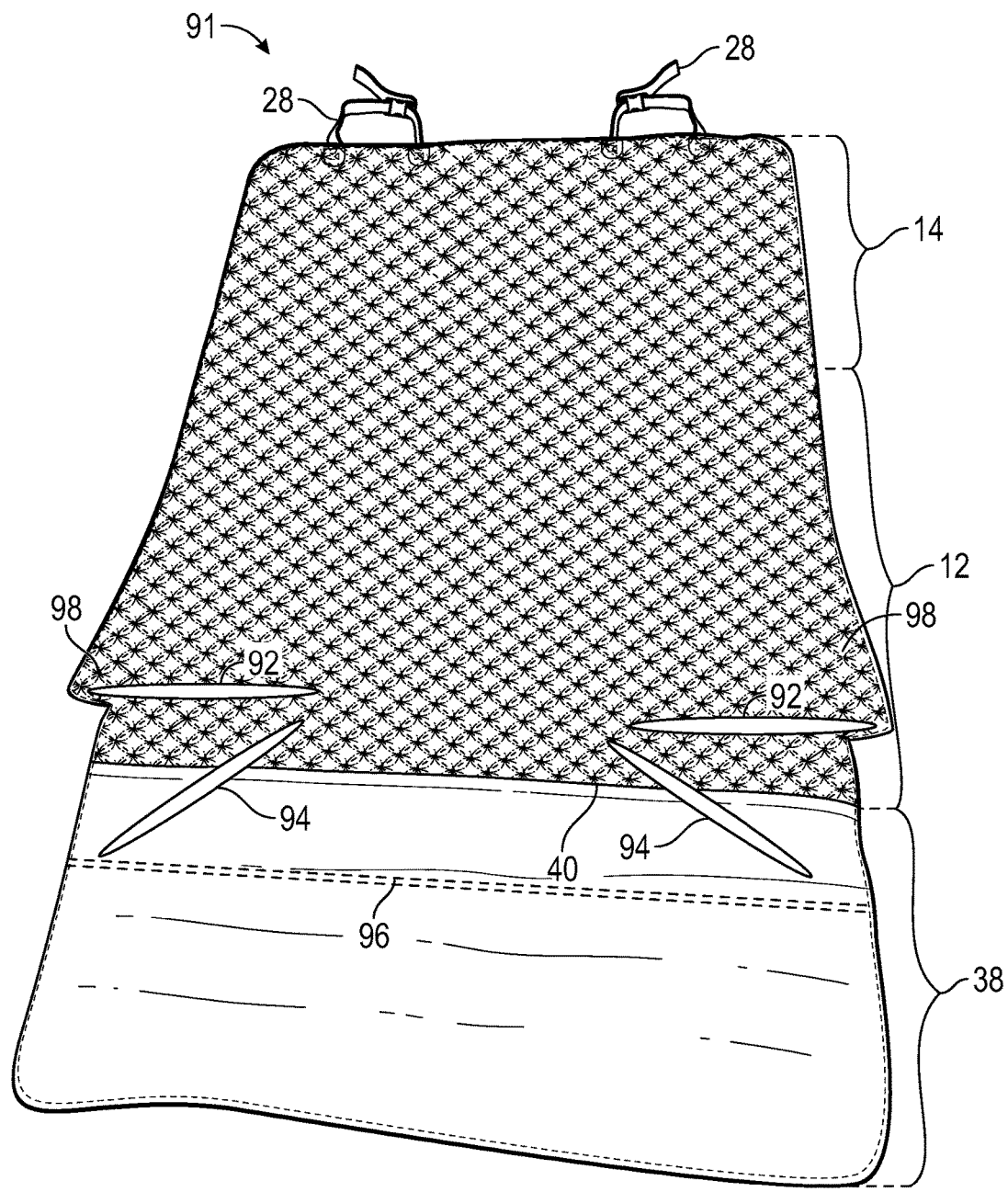
FIG. 17 is a top view of another example cover, according to some embodiments.

Referring now to FIG. 17, in some embodiments, the wings 75 may be extended to provide extended wings 98. The extended wings 98 may be extended at least toward a rearward end thereof, as illustrated in FIG. 17, or the extended wings 98 may be extended along their entire length (not shown). The extended wings 98 may allow for larger (or more/extending along a greater length) cargo bed coupling mechanisms 92 and larger (or more/extending along a greater length) guard coupling mechanisms 94. In such embodiments, the rear barrier formed when the cargo bed coupling mechanisms 92 and the guard coupling mechanisms 94 are engaged or coupled will form the top edge of the rear barrier at a higher height, thereby potentially serving to better retain objects in the vehicle cargo area.

Figure 18:
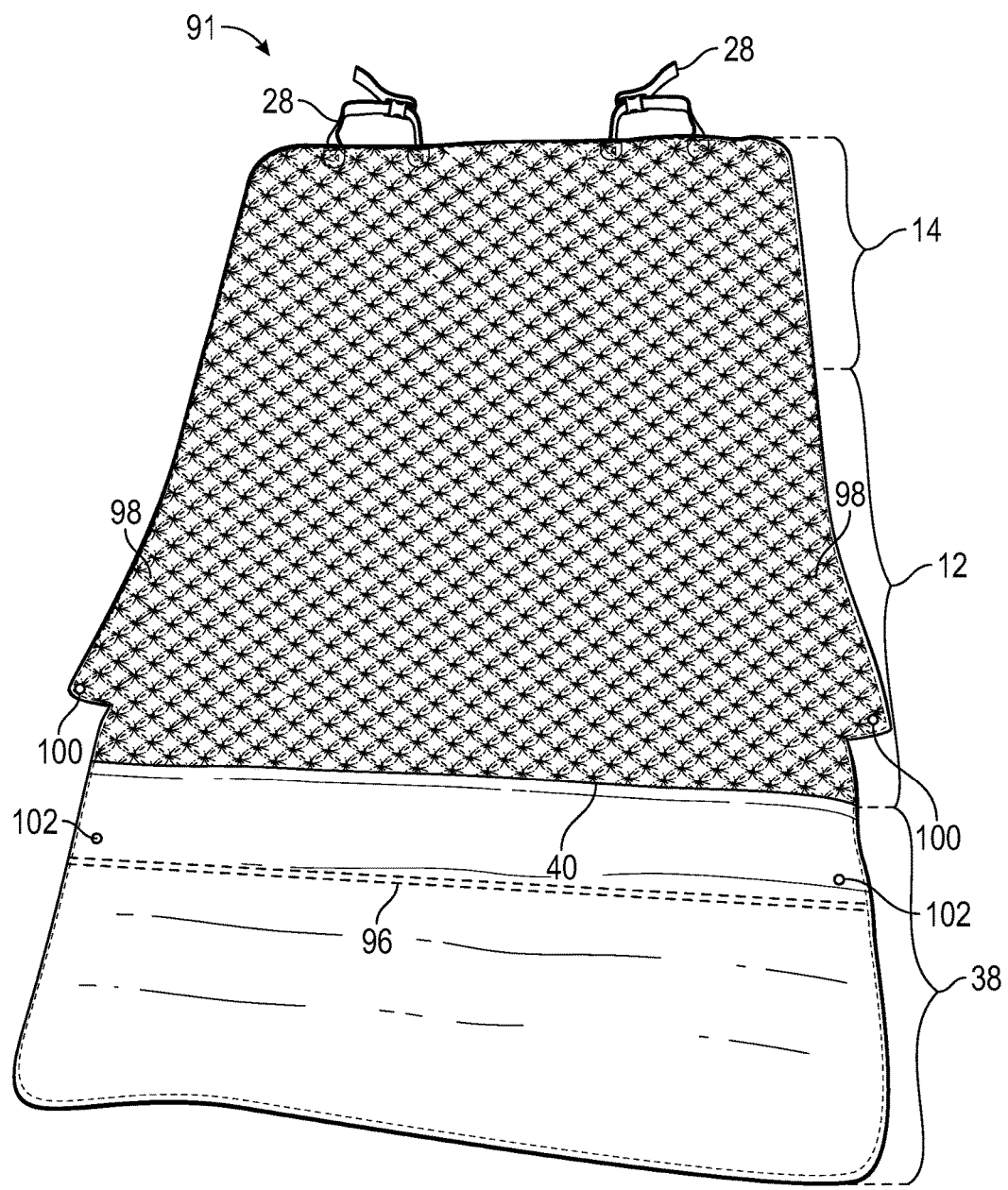
FIG. 18 is a top view of another example cover, according to some embodiments.

Referring now to FIG. 18, in some embodiments, the extended wings 98 may each be provided with a cargo bed fastener 100. Additionally, the guard portion 38 may be provided with corresponding guard fasteners 102. The cargo bed fasteners 100 and the guard fasteners may be configured to mate to secure the forward segment of the guard portion 38 in the elevated state. By way of example, the cargo bed fasteners 100 and the guard fasteners 102 may be mating portions of a snap, or may be a hook and an eyelet, or may be a button and a buttonhole, or may be any other type of fastener capable of securing the forward segment of the guard portion 38 in the elevated state. As shown in FIG. 18, the guard portion of some embodiments may have the pocket 96 or other corresponding feature to receive a stiffening material, as discussed previously.

Figure 19:
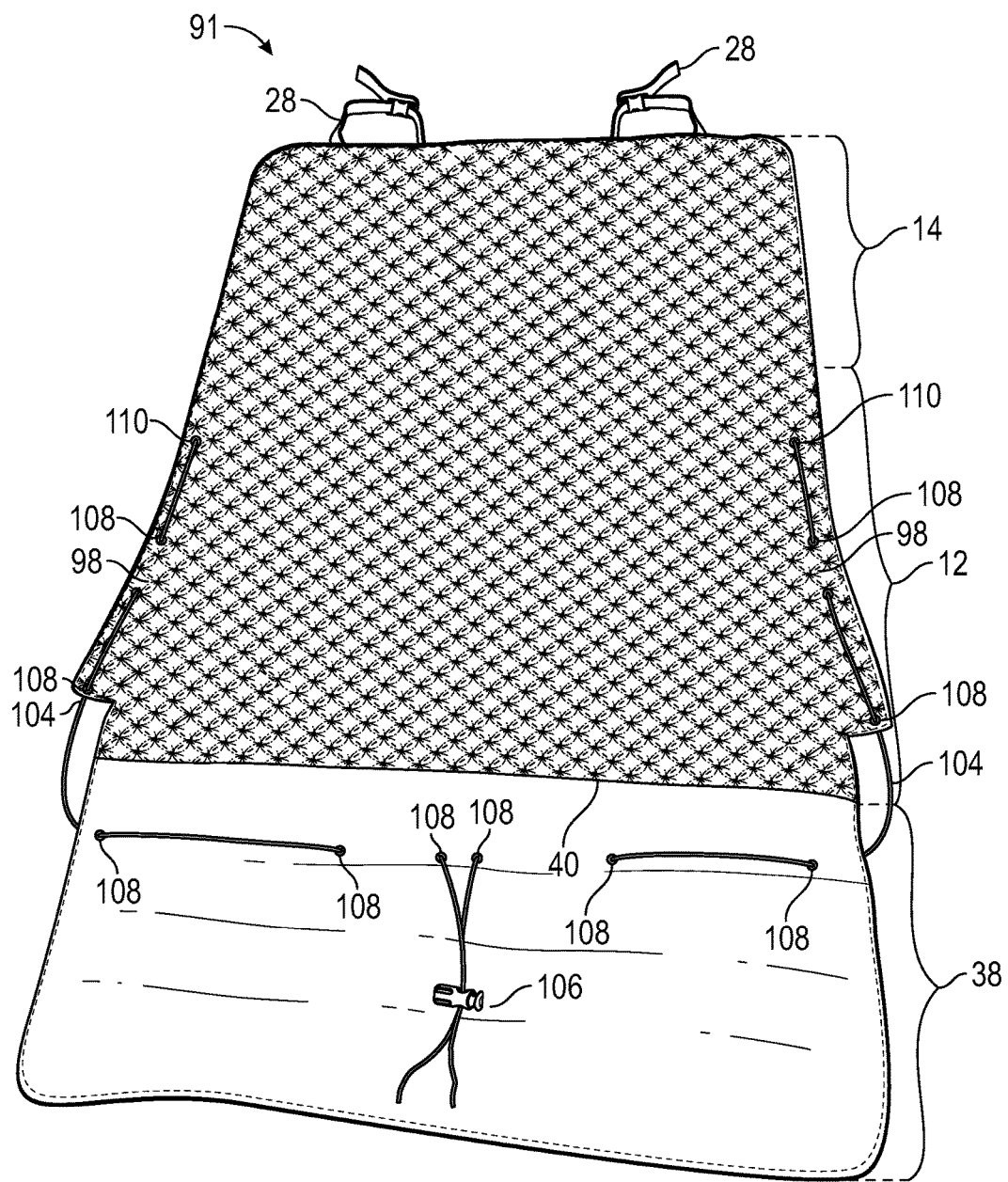
FIG. 19 is a top view of another example cover, according to some embodiments.
Figure 22:
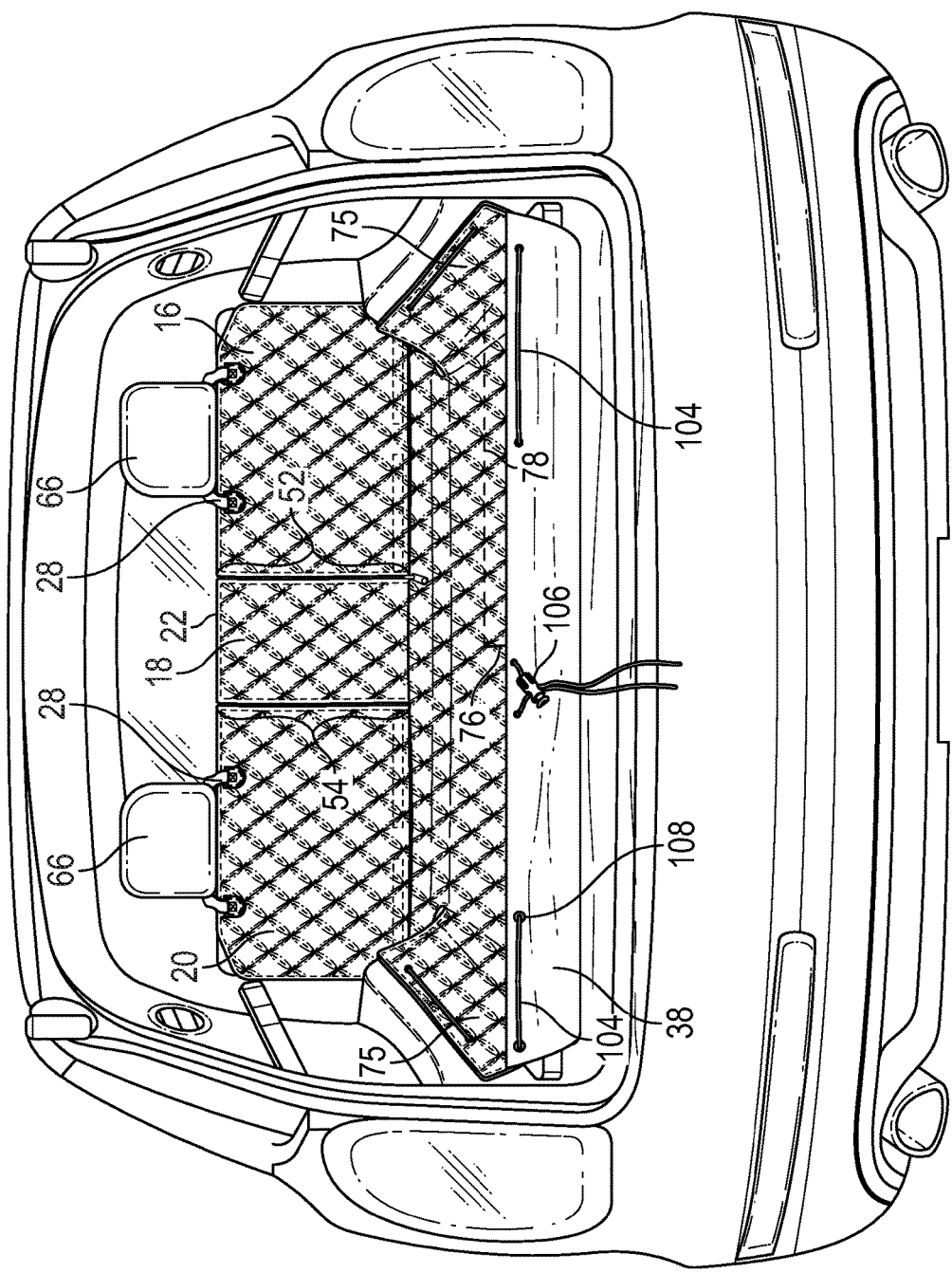
FIG. 22 is an upper perspective view of the cover of FIG. 19, illustrating a segment of the cover being raised into an elevated state to form a rear barrier.

Referring now to FIG. 19, in some embodiments a cord 104 extending between the lower portion 12 (and particularly the extended wing 98) and the guard portion 38 generally at a transition between the 38 portion and the guard portion 38. In some embodiments, the cord 104 extends along both sides of the cover 91, then meets at a single point where a cord lock 106 may be used to tighten the cord 104. The cord 104 passes through one or more grommets 108 and is secured at a fixed secure point 110 to the lower portion 12. When the cord 104 is pulled tight through the grommets 108 and the cord lock 106 is used to secure the cord 104 against loosening back through the grommets 108, the forward segment of the guard portion 38 is drawn into the elevated state to form the rear barrier, as illustrated in FIG. 22. When the guard portion 38 is to be manipulated to cover the bumper and lower the rear barrier, the cord lock 106 is released to provide slack to the cord 104, which then passes through the grommets 108 and allows the rear portion 38 to assume the lowered state.

The cord lock 106 is merely one example of a securing mechanism to reversibly secure the cord 104 in a shortened state. Any other securing mechanism may be used, such as a a hook affixed to the lower portion 12, a hook affixed to the guard portion 38, a hook affixed to a side wall or side window of the vehicle cargo area, a fastener affixed to the lower portion 12, a fastener affixed to the guard portion 38, and a fastener affixed to the side wall or side window of the vehicle cargo area. The cord 104 may be any desirable type of cord or rope, including shock cords and the like.

Figure 20:
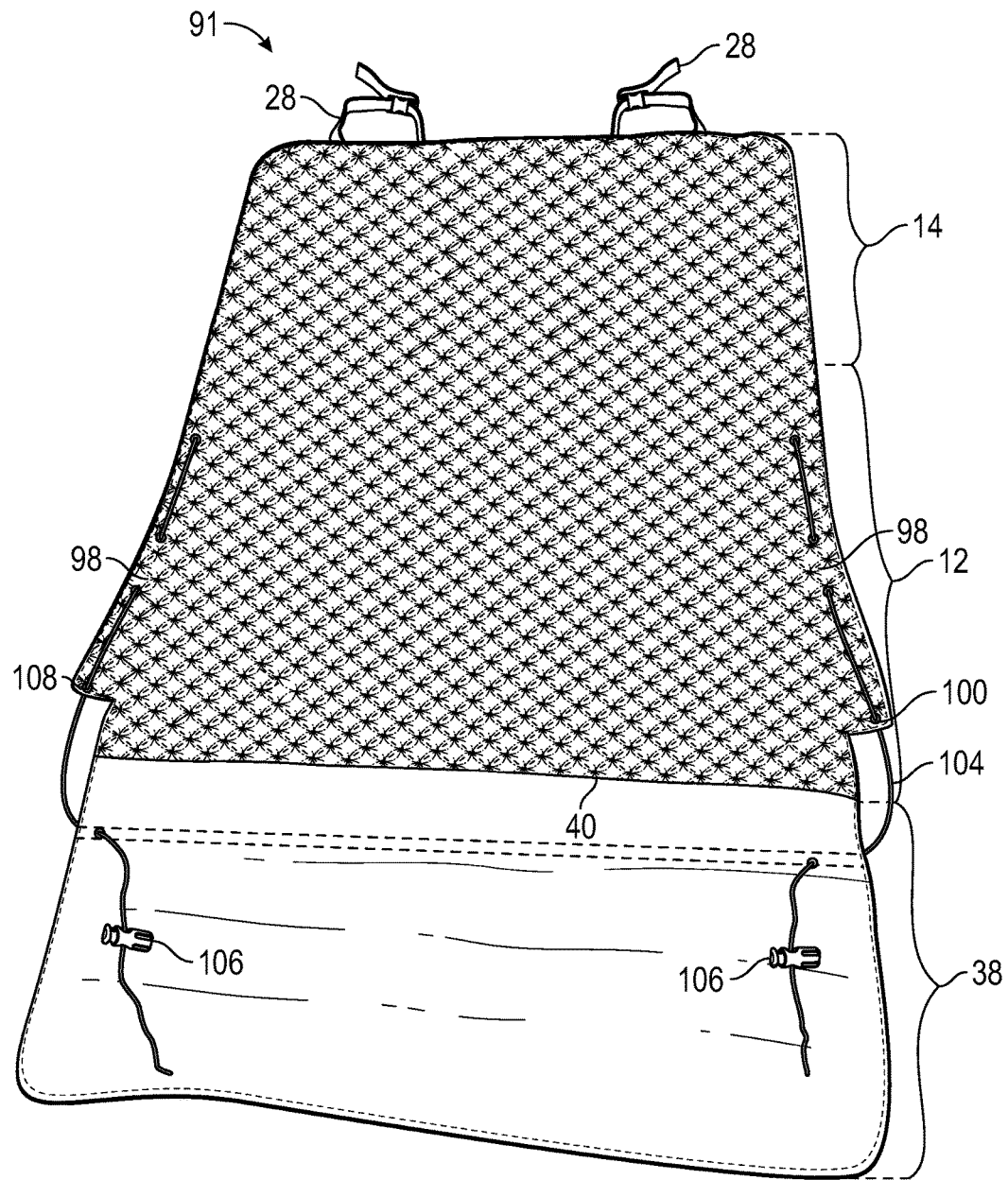
FIG. 20 is a top view of another example cover, according to some embodiments.

Referring now to FIG. 20, in some embodiments the cord 104 extending between the lower portion 12 and the guard portion 38 may be provided as two separate and separately tightened cords 104. The function of the cords 104 to raise the segment of the guard portion 38 into the elevated state to form the rear barrier and to lower the segment of the guard portion 38 into the lowered state is otherwise similar to that of embodiments illustrated in FIG. 19.

Figure 23:
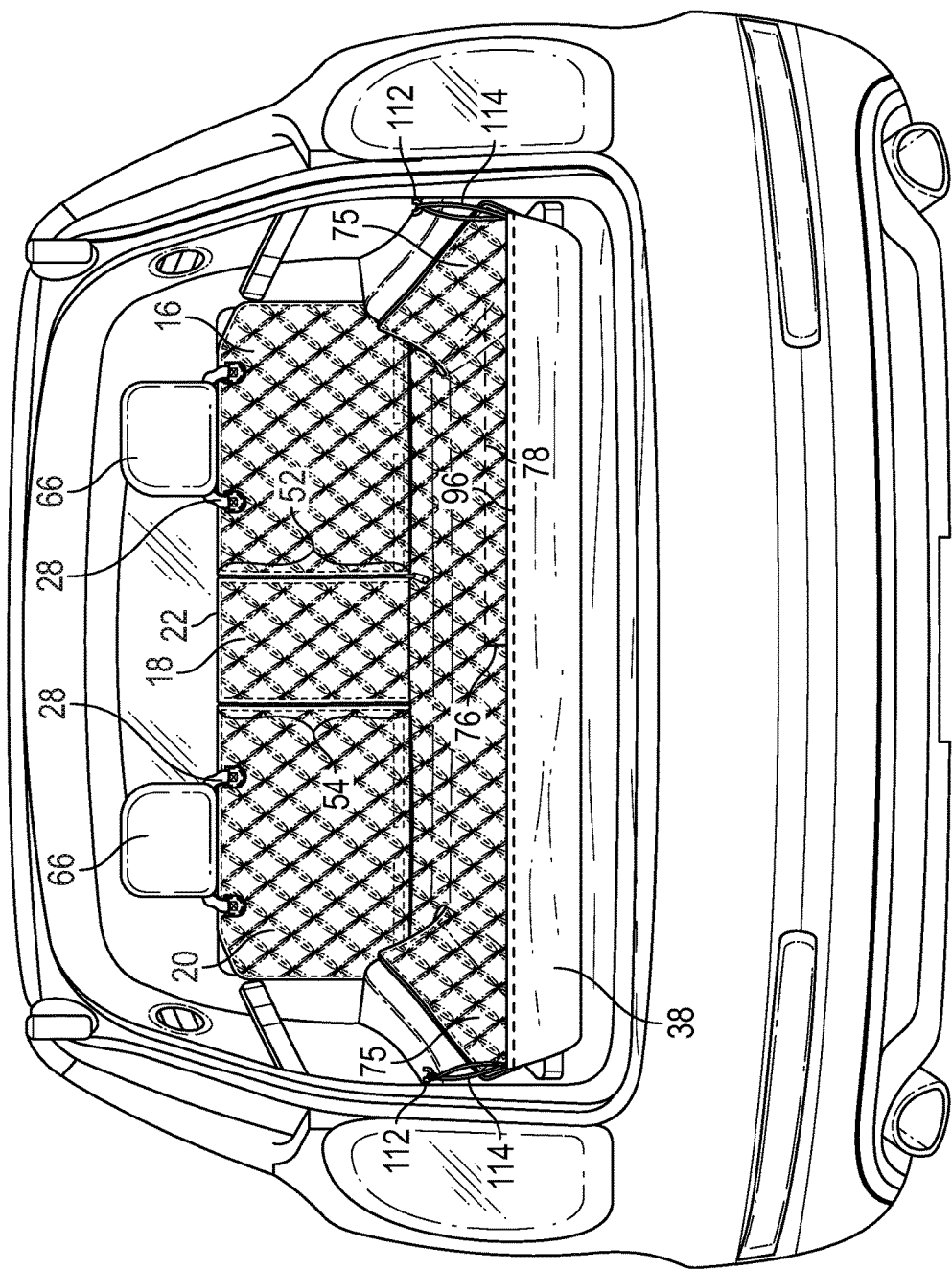
FIG. 23 is an upper perspective view of another example cover, according to some embodiments, illustrating a segment of the cover being raised into an elevated state to form a rear barrier.

Referring now to FIG. 23, in some embodiments, the cargo area of the vehicle is provided with a vehicle fastener 112 secured to a side window or side wall of the vehicle cargo area and a fastener engagement element 114 located on the guard portion 38 and spaced from a transition between the lower portion 12 and the guard portion 38. The fastener engagement element 114 may be configured to reversibly engage the vehicle fastener 112. The vehicle fastener 112 and the fastener engagement element 114 may be any elements adapted to reversibly and securely couple to each other, such as buttons, snaps, magnets, clasps, hook-and-loop fasteners, eyelets, hooks, and the like. In some embodiments, the vehicle fastener 112 may be a substantially smooth surface adapted to securely receive a suction cup thereon, and the fastener engagement element 114 may be a suction cup affixed to the guard portion 38. In some embodiments, the vehicle fastener 112 may be a suction cup affixed to a substantially smooth surface within the vehicle cargo area and having a hook or other fastener extending therefrom. As illustrated in FIG. 23, the pocket 96 may be used in some embodiments to receive the stiffening rod to minimize sagging of the rear barrier.

Figure 24:
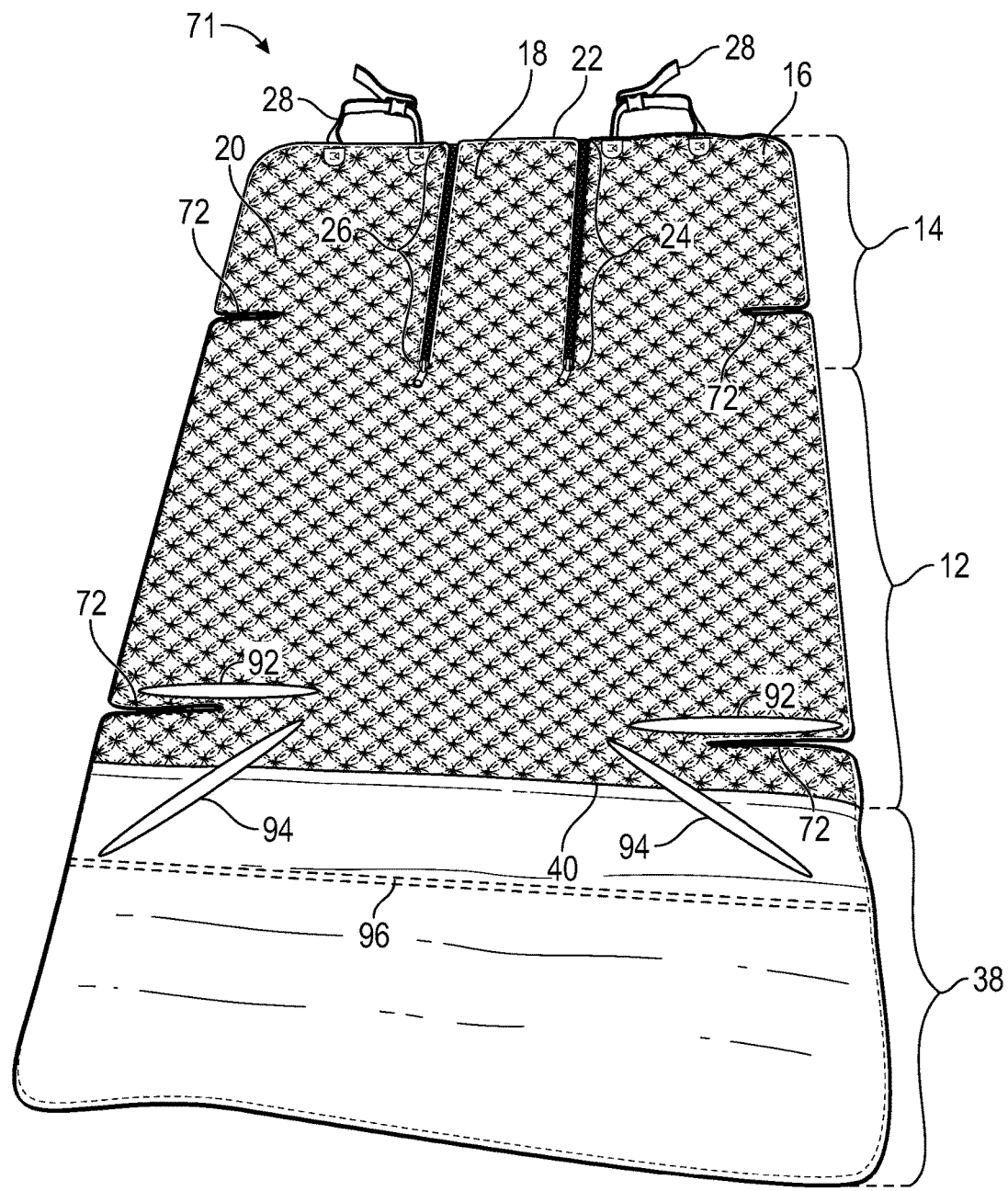
FIG. 24 is a top view of another example cover, according to some embodiments.

As illustrated in FIG. 24, in some embodiments, the cover 91 may include features relating to manipulating the guard area 38 between the elevated state and the lowered state, as well as other features of the cover 10 or the cover 91 discussed herein. For example, in some embodiments, the cover 91 may include features relating to manipulating the guard area 38, and may also retain the first vertical slit 24 and the second vertical slit 26, whereby the upper portion 14 is separable among the first section 16, the second section 18, and the third section 20. The first vertical slit 24 and the second vertical slit 26 may include respective coupling mechanisms as discussed previously.

Figure 25:
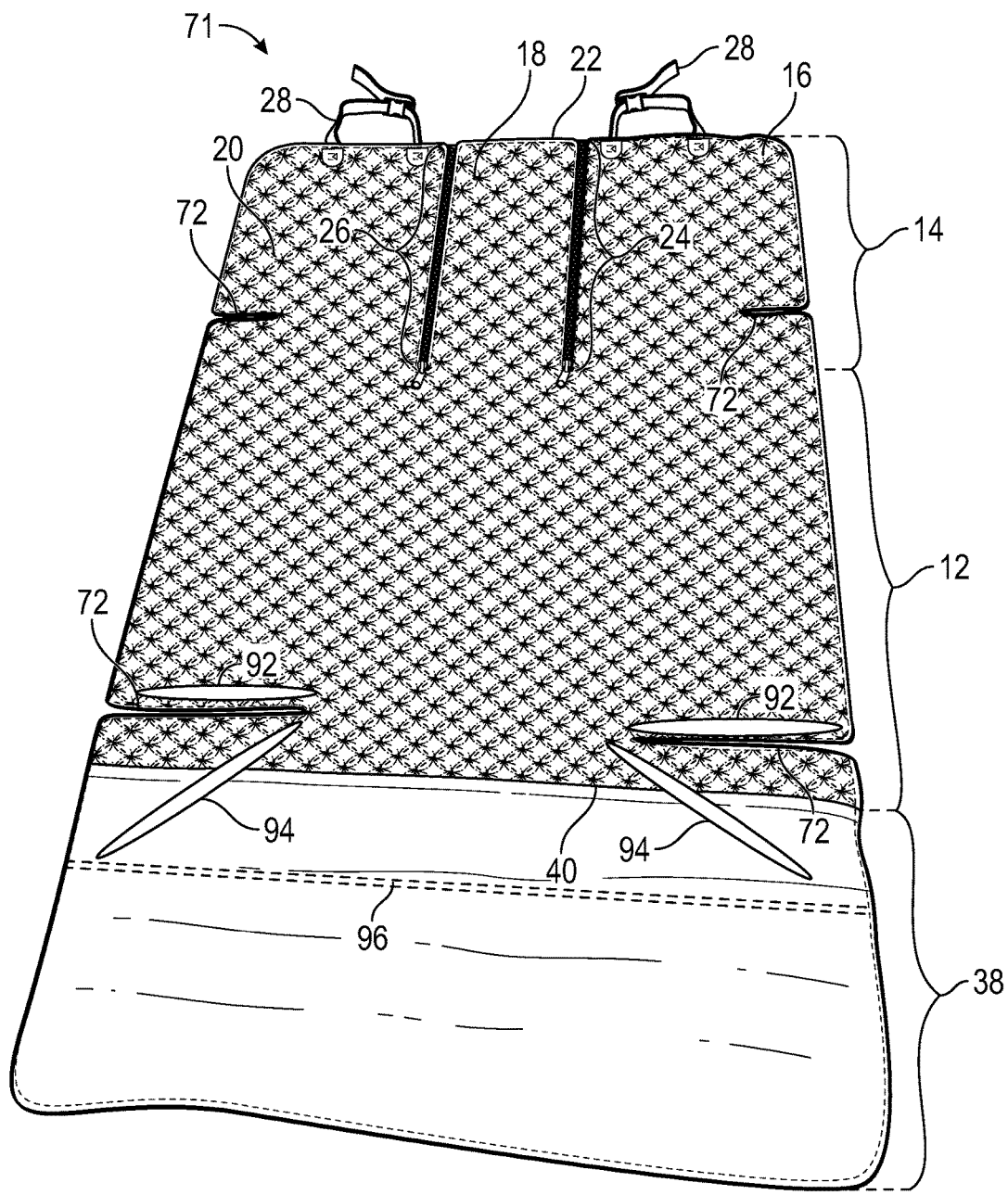
FIG. 25 is a top view of another example cover, according to some embodiments.

Also as illustrated in FIG. 24, the cover 91 of some embodiments includes slits 72. In some embodiments, as illustrated in FIG. 25, at least some of the slits 72 may extend farther into the lower portion 12 or cargo bed portion proximate the guard portion 34. In other embodiments, the slits 72 remain the same size as discussed previously. Larger slits 72, however, may allow the wings 75 to elevate to a greater extent such that the wings may be reversibly coupled to the segment of the guard portion 38 in such a way as to permit a larger segment of the guard portion 38 to assume the elevated state. In some embodiments, as illustrated in FIGS. 24 and 25, the cargo bed coupling mechanisms 92 are disposed on the lower portion 12 proximate the slits 72.

One of skill in the art will appreciate that the various features and elements of the various embodiments of the present invention may be modified and/or combined within the spirit of the present invention to provide a seat cover, cargo seat cover, and/or head liner cover. For example, the size, dimensions, shapes, proportions and materials of the present invention may be modified as desired or necessary based on, for example, a vehicle configuration, shape, or dimensions. For example, quantity and/or placement of one or more vertical slits, such as for example, the first vertical slit 24 and/or the second vertical slit 26, may be varied. As another example, quantity and/or placement of one or more openings, such as the first opening 30, the second opening 32, the third opening 34, and/or the fourth opening 36 may be varied. In some embodiments, the one or more openings may be disposed within the first section 16 and/or the second section 18. In some embodiments, a particular cover, such as, for example, the cover 10, the cover 71, and/or the cover 91, may be customized according to predetermined specifications to fit a particular vehicle interior. In some embodiments, a particular cover, such as, for example, the cover 10, the cover 71 and/or the cover 91, may be configured to fit various vehicle interiors and seat configurations, as described in the present specification.

The present invention may be embodied in other specific forms without departing from its structures, methods, or other essential characteristics as broadly described herein and claimed hereinafter. Therefore, the described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A cargo liner for a vehicle, comprising:
    a cargo bed portion sized and configured to extend over a horizontally-oriented surface of a vehicle cargo area;
    a seatback portion extending from the cargo bed portion, wherein the seatback portion is sized and configured to extend upwardly over a seatback of a vehicle seat;
    a guard portion having a forward edge coupled to a lower edge of the cargo bed portion, and a rearward edge opposite the forward edge, and configured to extend over a bumper of the vehicle; and
    a guard portion elevating mechanism extending across the guard portion parallel to the lower edge of the cargo bed portion and at a position between the forward edge and the rearward edge, including at the rearward edge, and that is manipulable to cause the guard portion to transition between a lowered state wherein the guard portion is configured to extend over the bumper of the vehicle, and an elevated state wherein a surface of the guard portion extends upwardly to provide a barrier.

2. The cargo liner of claim 1, further comprising a plurality of slits arranged about a perimeter of the cargo bed portion to provide at least one articulable surface of the guard portion.

3. The cargo liner of claim 2, wherein two of the plurality of slits are interposed between the cargo bed portion and the guard portion.

4. The cargo liner of claim 1, further comprising a pocket extending across the guard portion parallel to the lower edge of the cargo bed portion.

5. The cargo liner of claim 4, wherein the guard portion elevating mechanism comprises a cord positioned within the pocket.

6. The cargo liner of claim 1, wherein the seatback portion has a first section, a second section, and a third section, wherein each of the first section, the second section, and the third section extend from an upper edge of the seatback portion to the cargo bed portion, the cargo liner further comprising:
   a first coupling mechanism configured to couple the first section to the second section; and
   a second coupling mechanism configured to couple the second section to the third section.

7. The cargo liner of claim 1, further comprising a stiffening rod extending across the guard portion.

8. The cargo liner of claim 7, further comprising a pocket extending across the guard portion parallel to the lower edge of the cargo bed portion, wherein the stiffening rod is positioned within the pocket.

9. The cargo liner of claim 1, wherein the cargo bed portion further comprises a pair of cargo bed coupling mechanisms on the cargo bed portion and a corresponding pair of guard coupling mechanisms on the guard portion, whereby coupling adjacent cargo bed and guard coupling mechanisms transitions a surface of the guard portion into the elevated state to provide the barrier.

10. The cargo liner of claim 9, wherein the cargo bed coupling mechanisms and the guard coupling mechanism are selected from the group consisting of zippers, hook-and-loop fasteners, buttons, snaps, clasps, magnets, eyelets, and hooks.

11. The cargo liner of claim 1, wherein the guard portion elevating mechanism comprises a cord.

12. The cargo liner of claim 11, wherein the cord comprises a shock cord having a relaxed state and a stretched state, wherein when the cord is in the relaxed state the guard portion is in the lowered state, and when the cord is in the stretched state the guard portion is in the elevated state.

13. The cargo liner of claim 11, wherein the cord comprises a fastener engagement element configured to secure the cord to a vehicle fastener.

* * * * *